(12) United States Patent
Xu

(10) Patent No.: US 12,004,017 B2
(45) Date of Patent: Jun. 4, 2024

(54) SERVICE PROCESSING METHOD AND APPARATUS, CHIP, AND COMPUTER PROGRAM

(71) Applicant: GUANGDONG OPPO MOBILE TELECOMMUNICATIONS CORP., LTD., Guangdong (CN)

(72) Inventor: Yang Xu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 420 days.

(21) Appl. No.: 17/390,746

(22) Filed: Jul. 30, 2021

(65) Prior Publication Data
US 2022/0014975 A1 Jan. 13, 2022

Related U.S. Application Data

(63) Continuation of application No. PCT/CN2019/074675, filed on Feb. 3, 2019.

(51) Int. Cl.
*H04W 36/00* (2009.01)

(52) U.S. Cl.
CPC .............. *H04W 36/0011* (2013.01)

(58) Field of Classification Search
CPC .............. H04W 36/0011; H04W 36/0061
See application file for complete search history.

(56) References Cited

U.S. PATENT DOCUMENTS

| | | |
|---|---|---|
| 2013/0016697 A1 | 1/2013 | Forssell |
| 2014/0050142 A1 | 2/2014 | Song et al. |
| 2014/0051442 A1 | 2/2014 | Yang et al. |
| 2017/0201915 A1* | 7/2017 | Decarreau ............... H04W 8/22 |
| 2018/0049267 A1* | 2/2018 | Chen ...................... H04W 76/27 |
| 2020/0053803 A1* | 2/2020 | Youn ...................... H04L 67/148 |
| 2020/0107213 A1* | 4/2020 | Park ...................... H04L 61/5007 |
| 2021/0211951 A1* | 7/2021 | Ma ........................ H04W 76/10 |
| 2021/0227452 A1 | 7/2021 | Munz et al. |
| 2021/0282058 A1 | 9/2021 | Jin et al. |

(Continued)

FOREIGN PATENT DOCUMENTS

| | | |
|---|---|---|
| CN | 101730233 A | 6/2010 |
| CN | 101790221 A | 7/2010 |

(Continued)

OTHER PUBLICATIONS

The first Office Action of corresponding Chinese application No. 201980019583.3, dated Aug. 24, 2021.

(Continued)

*Primary Examiner* — Sharmin Chowdhury
(74) *Attorney, Agent, or Firm* — Ladas & Parry, LLP

(57) ABSTRACT

The present application discloses a service processing method and apparatus, a chip, and a computer program, where the method includes: service support indication information; indication information of an effective area; indication information of a first behavior; status indication information of a terminal device; indication information of first behavior execution time; first behavior retry time. By applying the solution described in the present application, the reasonable deployment and handover control of the service can be realized.

13 Claims, 17 Drawing Sheets

(56) References Cited

U.S. PATENT DOCUMENTS

2022/0046508 A1* 2/2022 Xu .................. H04W 28/02
2022/0116839 A1* 4/2022 Tseng ................ H04W 36/36

FOREIGN PATENT DOCUMENTS

| CN | 102076036 | A  | 5/2011  |
|----|-----------|----|---------|
| CN | 102316540 | A  | 1/2012  |
| CN | 103716787 | A  | 4/2014  |
| CN | 103796249 | A  | 5/2014  |
| CN | 105050140 | A  | 11/2015 |
| CN | 108024294 | A  | 5/2018  |
| CN | 10941138  | A  | 12/2018 |
| CN | 109041137 | A  | 12/2018 |
| CN | 109151940 | A  | 1/2019  |
| CN | 109168180 | A  | 1/2019  |
| CN | 109257778 | A  | 1/2019  |
| WO | 2009042681 | A2 | 4/2009  |
| WO | 2020/155172 | A1 | 8/2020  |

OTHER PUBLICATIONS

International Search Report (ISR) dated Aug. 2, 2019 for International Application No. PCT/CN2019/074675.
Written Opinion dated Aug. 2, 2019 for International Application No. PCT/CN2019/074675.
The second Office Action of corresponding Chinese application No. 201980019583.3, dated Nov. 4, 2021, all pages.
The Notice of Allowance of corresponding Chinese application No. 201980019583.3, dated Dec. 28, 2021, all pages.
Lu Ma et al. Research and Implementation of Service Oriented 5G Core Network Slice Management System, published on Nov. 27, 2018, with English Abstract and machine English translation, all pages.
Shaohui Sun et al. Overview on the Progress of Design and Standardization og the Fifth Generation of Mobile Communications System, published on Nov. 20, 2018, with English Abstract and machine English translation, all pages.
3GPP TSG RAN meeting #75 RP-170376; Study on New Radio Access Technology. Dubrovnik, Croatia, Mar. 6-9, 2017, all pages.
The EESR of corresponding European application No. 19914153.2, dated Feb. 3, 2022.

* cited by examiner

SERVICE PROCESSING METHOD AND APPARATUS, CHIP, AND COMPUTER PROGRAM

CROSS-REFERENCE TO RELATED APPLICATION

This application is a continuation of International Application No. PCT/CN2019/074675, filed on Feb. 3, 2019, which is hereby incorporated by reference in its entirety.

TECHNICAL FIELD

The present application relates to wireless network technology, and in particular, to a service processing method and apparatus, a chip, and a computer program.

BACKGROUND

In a time sensitive network (TSN), a data packet will be transmitted at a specific period and a time point, and multiple nodes that need to pass through from a source end to a destination end are called TSN bridges, which will reserve a resource for specific TSN data at a specific time according to a negotiated requirement to ensure its sequential transmission, thus ensuring that the TSN data transmission time from the source end to the destination end is determined.

In order to support the TSN transmission, a 5G system as a whole serves as a TSN bridge, and other TSN bridges connected with the 5G system regard the 5G system as an ordinary TSN bridge for TSN data transmission and information interaction.

At present, cross-base station handover of the 5G system mainly includes a handover based on a N2 interface and a handover based on an Xn interface.

The support for the TSN service needs the support of air interface and core network, that is, it needs to ensure a fixed transmission delay and a deployment of a proprietary function, etc. Therefore, it is necessary to limit the area where the terminal device can switch or access, otherwise the smooth execution of the TSN service will not be guaranteed. In addition, at present, when a switching is executed, all current bearers will be requested to switch, which will affect the speed and the efficiency of the switching.

SUMMARY

In view of this, embodiments of the present application provide a service processing method and apparatus, a chip, and a computer program.

In the first aspect, a service processing method is provided, including:
 obtaining, by a first base station, first indication information from a network side; where the first indication information includes at least one of the following: service support indication information; indication information of an effective area; indication information of a first behavior; status indication information of a terminal device; indication information of first behavior execution time; first behavior retry time.

In the second aspect, a service processing method is provided, including:
 carrying, by a first base station, only part of a data flow and/or session information when transmitting a handover request message to a second base station and/or a core network.

In the third aspect, a service processing method is provided, including:
 triggering, by a first base station, a handover request to a second base station;
 obtaining, by the first base station, second indication information from the second base station, where the second indication information includes at least one of the following:
 incapable of establishing a first data stream and/or a session;
 incapable of guaranteeing a quality of service QoS parameter of the first data stream and/or the session; and
 a handover request being failed.

In the fourth aspect, a service processing method is provided, including:
 obtaining, by a terminal device, first indication information from a network side; where the first indication information includes at least one of the following: service support indication information; indication information of an effective area; indication information of a first behavior; status indication information of a terminal device; indication information of first behavior execution time; first behavior retry time.

In the fifth aspect, a service processing method is provided, including:
 obtaining, by a terminal device, fourth indication information from a first base station, where the fourth indication information is used to indicate that the terminal device stays within a coverage area of the first base station or show inability of guarantee a QoS of a first service after the terminal device leaves the coverage area of a current base station.

In the sixth aspect, a service processing method is provided, including:
 transmitting, by a network side, first indication information to a terminal device and/or a first base station; where the first indication information includes at least one of the following: service support indication information; indication information of an effective area; indication information of a first behavior; status indication information of a terminal device; indication information of first behavior execution time; first behavior retry time.

In the seventh aspect, a service processing apparatus is provided, which is used for executing the above method in the first aspect or each implementation of the first aspect.

Specifically, the service processing apparatus includes a functional module for executing the above method in the first aspect or each implementation of the above first aspect.

In the eighth aspect, a service processing apparatus is provided, which is used for executing the above method in the second aspect or each implementation of the second aspect.

Specifically, the service processing apparatus includes a functional module for executing the above method in the second aspect or each implementation of the above second aspect.

In the ninth aspect, a service processing apparatus is provided, which is used for executing the above method in the third aspect or each implementation of the third aspect.

Specifically, the service processing apparatus includes a functional module for executing the above method in the third aspect or each implementation of the above third aspect.

In the tenth aspect, a service processing apparatus is provided, which is used for executing the above method in the fourth aspect or each implementation of the fourth aspect.

Specifically, the service processing apparatus includes a functional module for executing the above method in the fourth aspect or each implementation of the above fourth aspect.

In the eleventh aspect, a service processing apparatus is provided, which is used for executing the above method in the fifth aspect or each implementation of the fifth aspect.

Specifically, the service processing apparatus includes a functional module for executing the above method in the fifth aspect or each implementation of the above fifth aspect.

In the twelfth aspect, a service processing apparatus is provided, which is used for executing the above method in the sixth aspect or each implementation of the sixth aspect.

Specifically, the service processing apparatus includes a functional module for executing the above method in the sixth aspect or each implementation of the above sixth aspect.

In the thirteenth aspect, a communication device is provided, including a processor and a memory, the memory is configured to store a computer program, and the processor is configured to call and run the computer program stored in the memory to execute any one of the above method in the first to sixth aspects or each implementation of the above first to sixth aspects.

In the fourteenth aspect, a chip is provided, configure to implement any one of the above method in the first to sixth aspects or each implementation of the above first to sixth aspects.

Specifically, the chip includes a processor, configured to call and run a computer program from the memory, enables the device installed with the chip to execute any one of the above method in the first to sixth aspects or each implementation of the above first to sixth aspects.

In the fifteen aspect, a computer-readable storage medium is provided, configured to store a computer program that enables a computer to execute any one of the above method in the first to sixth aspects or each implementation of the above first to sixth aspects.

In the sixteenth aspect, a computer program product is provided, including computer program instructions that enables a computer to execute any one of the above method in the first to sixth aspects or each implementation of the above first to sixth aspects.

In the seventeenth aspect, a computer program is provided, which when run on a computer, enables the computer to execute any one of the above first to sixth aspects or each implementation method of the above first to sixth aspects.

Based on the above introduction, it can be seen that, with the solution described in the present application, the first base station can obtain the first indication information from the network side, which may include various indication information such as service support indication information and/or indication information of an effective area and/or indication information of a first behavior and/or status indication information of a terminal device and/or indication information of first behavior execution time, thus the effective area of the service is effectively defined, which provides great help for the reasonable deployment and the handover control of the service. Moreover, when the first base station transmits the handover request message to the target base station and/or the core network, it can only carry part of the data flow and/or the session information, and it is not necessary to request the handover of all the current bearers, thus improving the handover speed and efficiency.

DESCRIPTION OF EMBODIMENTS

The technical solutions in the embodiments of the present application will be described hereunder with reference to the accompanying drawings in the embodiments of the present application. Obviously, the described embodiments are a part of the embodiments of the present application, rather than all embodiments of the present application. All other embodiments obtained by those skilled in the art based on the embodiments of the present application without any creative effort should fall into the scope claimed in the present application.

The technical solutions of the embodiments of the present application can be applied to various communication systems, such as: global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, a universal mobile telecommunication system (UMTS), a worldwide interoperability for microwave access (WiMAX) communication system or 5G system, etc.

Figure 1:
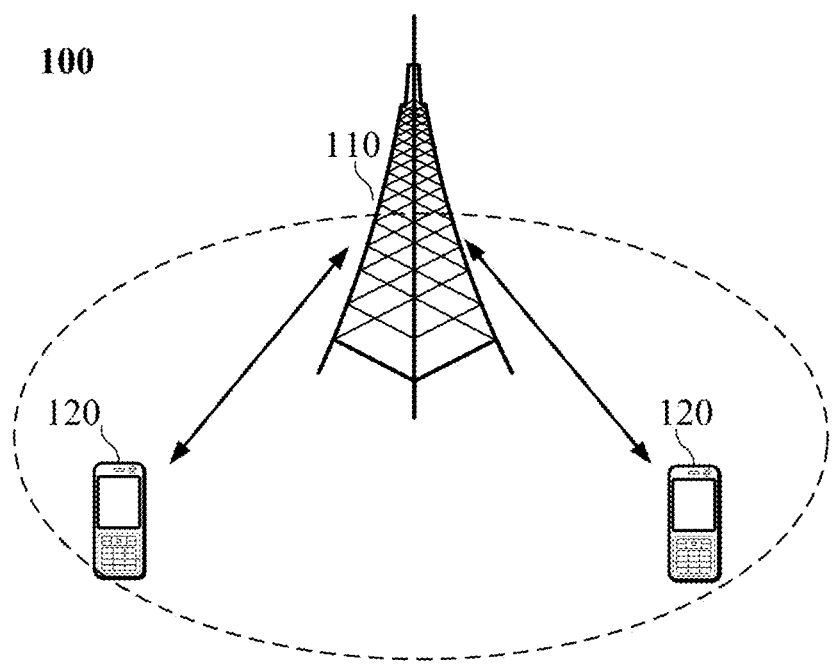
FIG. 1 is a schematic diagram of a communication system architecture provided by an embodiment of the present application.

Exemplarily, FIG. 1 is a schematic diagram of a communication system architecture provided by an embodiment of the present application. The communication system 100 may include a network device 110, and the network device 110 may be devices communicate with a terminal device 120 (or called a communication terminal or terminal). The network device 110 may provide communication coverage for a specific geographic area, and may communicate with terminal devices located within the coverage area. Optionally, the network device 110 may be a base transceiver station (BTS) in a GSM system or a CDMA system, a NodeB (NB) in a WCDMA system, an evolutional Node B (eNB or eNodeB) in an LTE system or a wireless controller in a cloud radio access network (CRAN), or the network equipment can be a mobile switching center, a relay station, an access point, a vehicle-mounted device, a wearable device, a hub, a switch, a bridge, a router, a network equipment in the 5G network or in a public land mobile network (PLMN) of future evolution and so forth.

The communication system 100 further includes at least one terminal device 120 located within a coverage of the network device 110. As the "terminal device" used herein, includes, but is not limited to, connection via wired lines, such as connection via public switched telephone networks (PSTN), digital subscriber line (DSL), digital cables and direct cable; and/or via another data connection/network; and/or via wireless interfaces, such as cellular networks, wireless local area networks (WLAN), digital TV networks (e.g., DVB-H networks), satellite networks and AM-FM broadcast transmitter; and/or another apparatus of other terminal device that is set to receive/send communication signals; and/or internet of things (IoT) devices. A terminal device set to communicate through a wireless interface may be referred to as a "wireless communication terminal", a "wireless terminal" or a "mobile terminal". Examples of mobile terminals include, but are not limited to, satellite or cellular phones; personal communications system (PCS) terminals that can combine cellular radio phones with data processing, fax and data communication capabilities; which can include radio phones, pagers, Internet/intranet access, Web browser, memo pad, calendar, and/or PAD of a global positioning system (GPS) receiver; as well as conventional laptop and/or palmtop receivers or others electronic devices including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user apparatus. The access terminal can be cellular phones, cordless phones, session initiation protocol (SIP) phones, wireless local loop (WLL) stations, personal digital assistants (PDA), handheld devices with wireless communication function, computing devices or other processing devices connected to wireless modems, vehicle-mounted devices, wearable devices, terminal devices in 5G networks, or terminal devices in the future evolution of PLMN and so forth.

Optionally, a device to device (D2D) communication may be performed between the terminal devices 120.

Optionally, a 5G system or a 5G network can also be called a New Radio (NR) system or a NR network.

The technical solutions of the embodiments of the present application can be applied to an unlicensed spectrum and a licensed spectrum, which is not limited by the embodiments of the present application.

FIG. 1 exemplarily shows one network device and two terminal devices.

Optionally, the communication system 100 may include multiple network devices and other numbers of terminal devices may be located within the coverage of each network device, which are not limited in the embodiment of the present application.

Optionally, the communication system 100 may also include other network entities, such as a network controller, a mobility management entity, etc., which are not limited in the embodiment of the present application.

It should be understood that the devices with communication functions in the network/system according to the embodiments of the present application may be termed as communication devices. Taking the communication system 100 shown in FIG. 1 as an example, the communication devices may include the network device 120 and the terminal device 110 with communication functions, and the network device 120 and the terminal device 110 may be specific devices described in the above, and details will not be described herein again. The communication devices may also include other devices in the communication system 100 besides the network device 120 and the terminal device 110, for example, other network entities, such as a network controller, a mobility management entity etc., which is not limited in the embodiments of the present application.

It should be understood that the terms "system" and "network" herein are often used interchangeably herein. The term "and/or" herein is only an association relationship describing associated objects, which means that there can be three kinds of relationships, for example, A and/or B, which can mean three cases that: A alone exists, A and B exist at the same time, B alone exists. In addition, the character "/" herein generally indicates that the associated objects before and after are in an "or" relationship.

Figure 2:
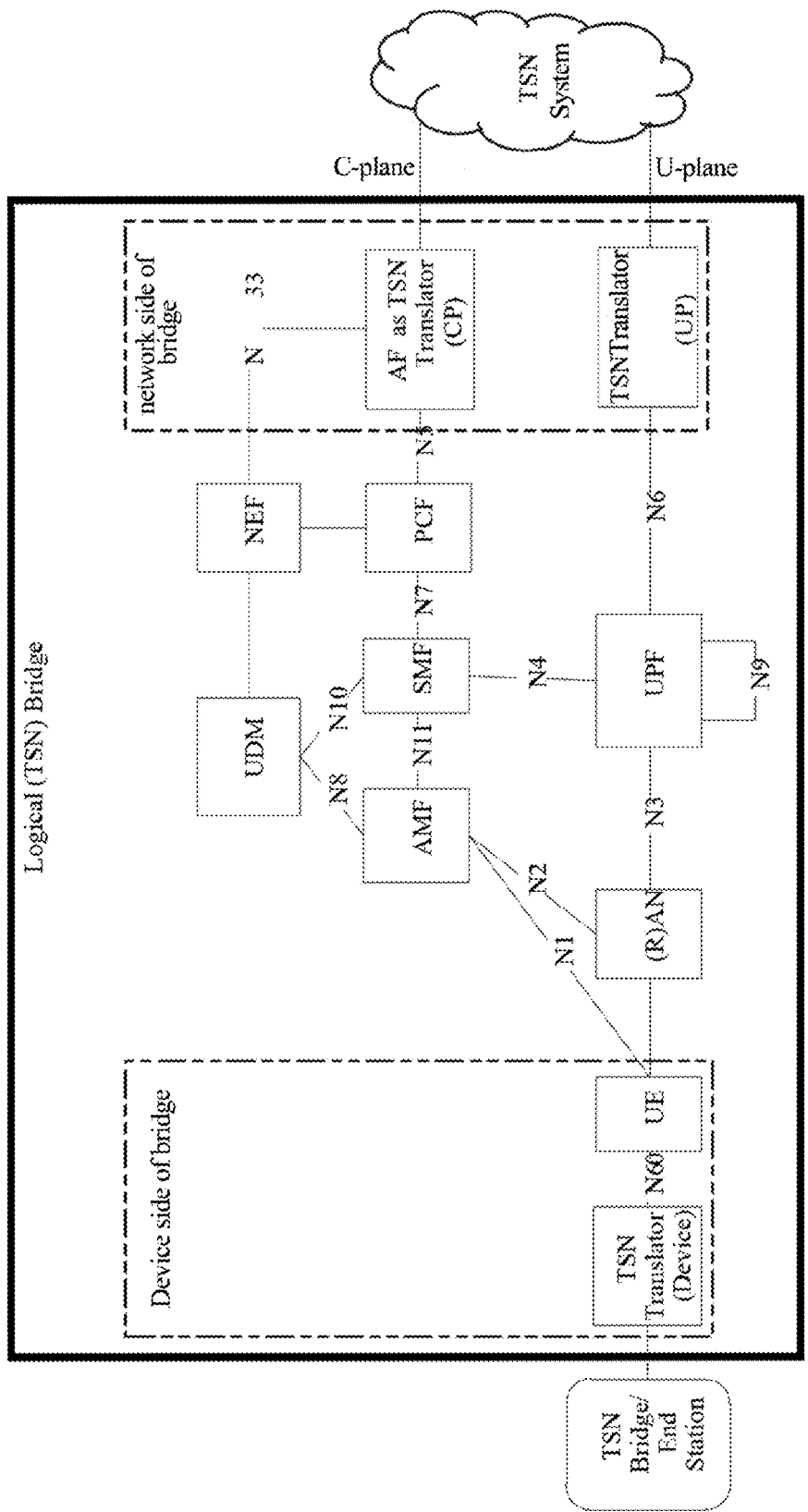
FIG. 2 is a schematic diagram of a 5G system architecture supporting the TSN transmission provided by an embodiment of the present application.

FIG. 2 is a schematic diagram of a 5G system architecture supporting the TSN transmission provided by an embodiment of the present application. As shown in FIG. 2, the 5G system as a whole is a TSN bridge, and other TSN bridges connected with the 5G system regard the 5G system as an ordinary TSN bridge for TSN data transmission and information interaction. The 5G system is provided with a TSN translator at the ingress and the egress, which are used to translate external parameters and map them into identifiable parameters within the 5G system. In addition, the translators also play the function of flow shaping.

The cross-base station handover of 5G system mainly includes a handover based on the N2 interface and a handover based on the Xn interface.

Figure 3A:
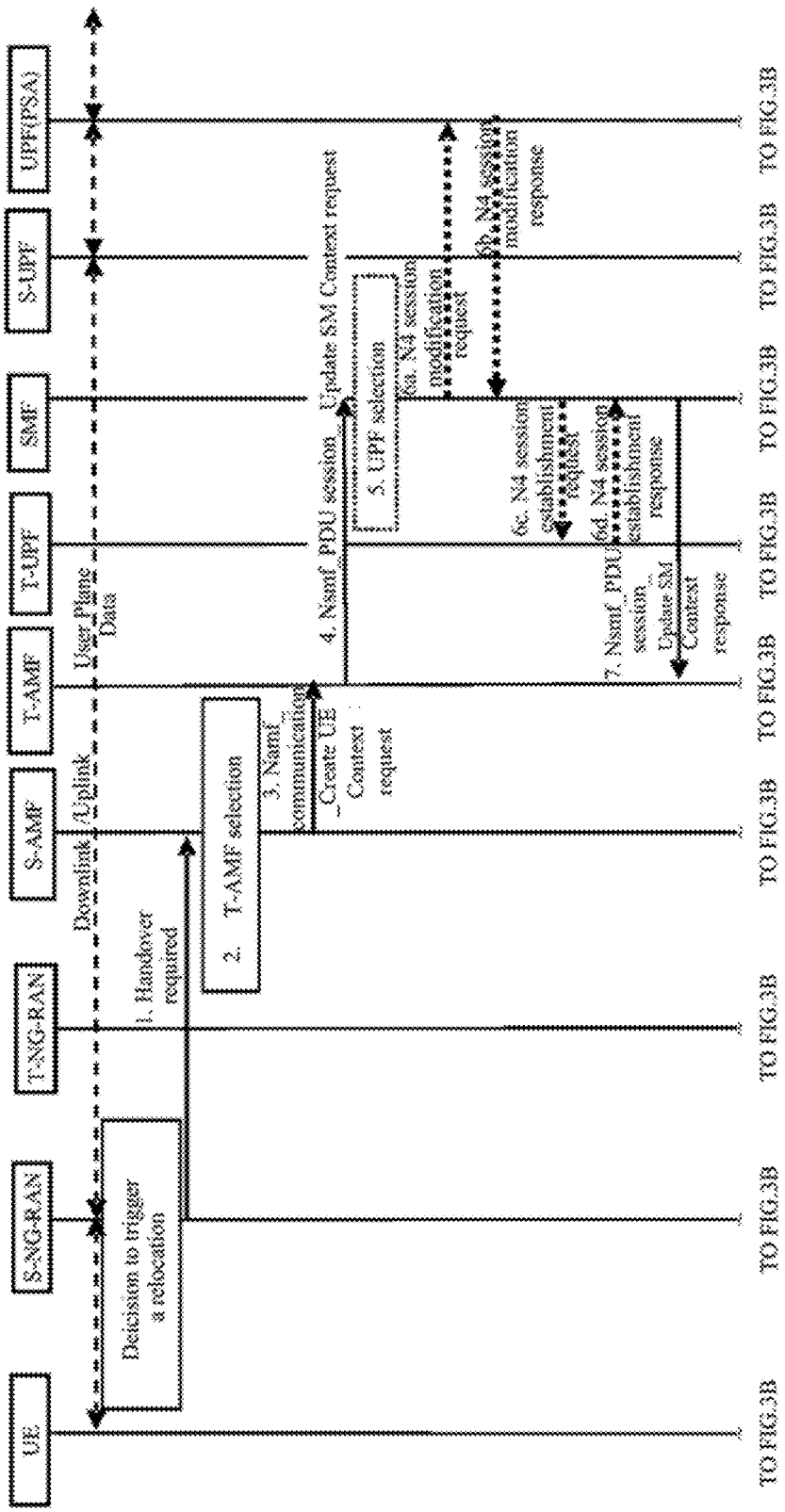
FIG. 3A and FIG. 3B are schematic diagrams of the preparation stage of a handover based on the N2 interface provided by an embodiment of the present application.
Figure 3B:
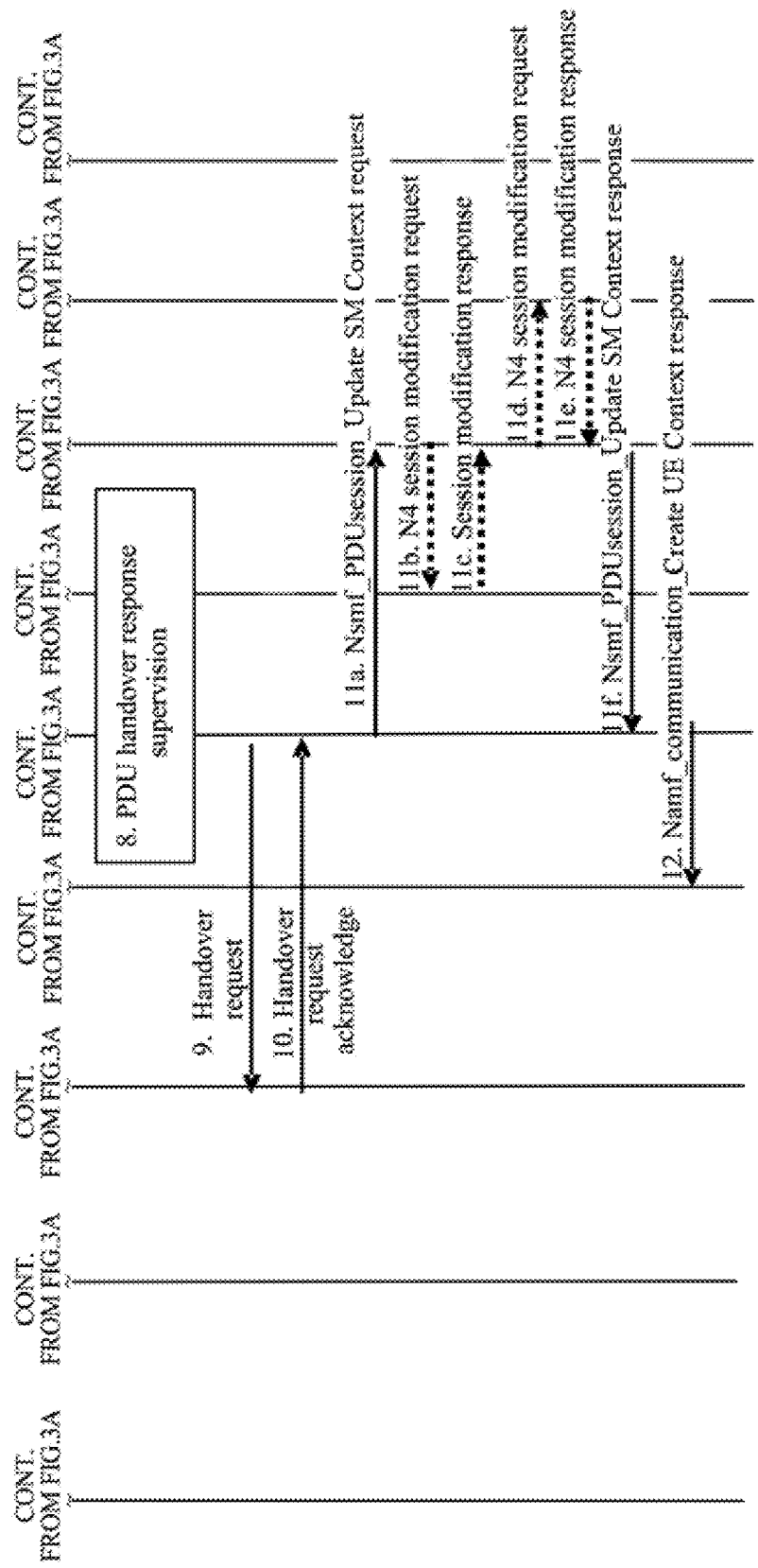

FIG. 3A and FIG. 3B are schematic diagrams of the preparation stage of a handover based on the N2 interface provided by an embodiment of the present application. As shown in FIG. 3A and FIG. 3B, a source base station (S-RAN, Source RAN Node) initiates a handover (HO)

request message, RAN is the abbreviation of Radio Access Network, a core network element interacts with a target base station (T-RAN, Target RAN Node) to confirm the bearer that can be switched, and a session management function entity (SMF)/authentication management function entity (AMF) will establish a Protocol Data Unit (PDU) session at the target side (which includes the interaction with the target base station and User Plane Function (UPF) of the core network), and reply to the AMF after the session is established.

Figure 4A:
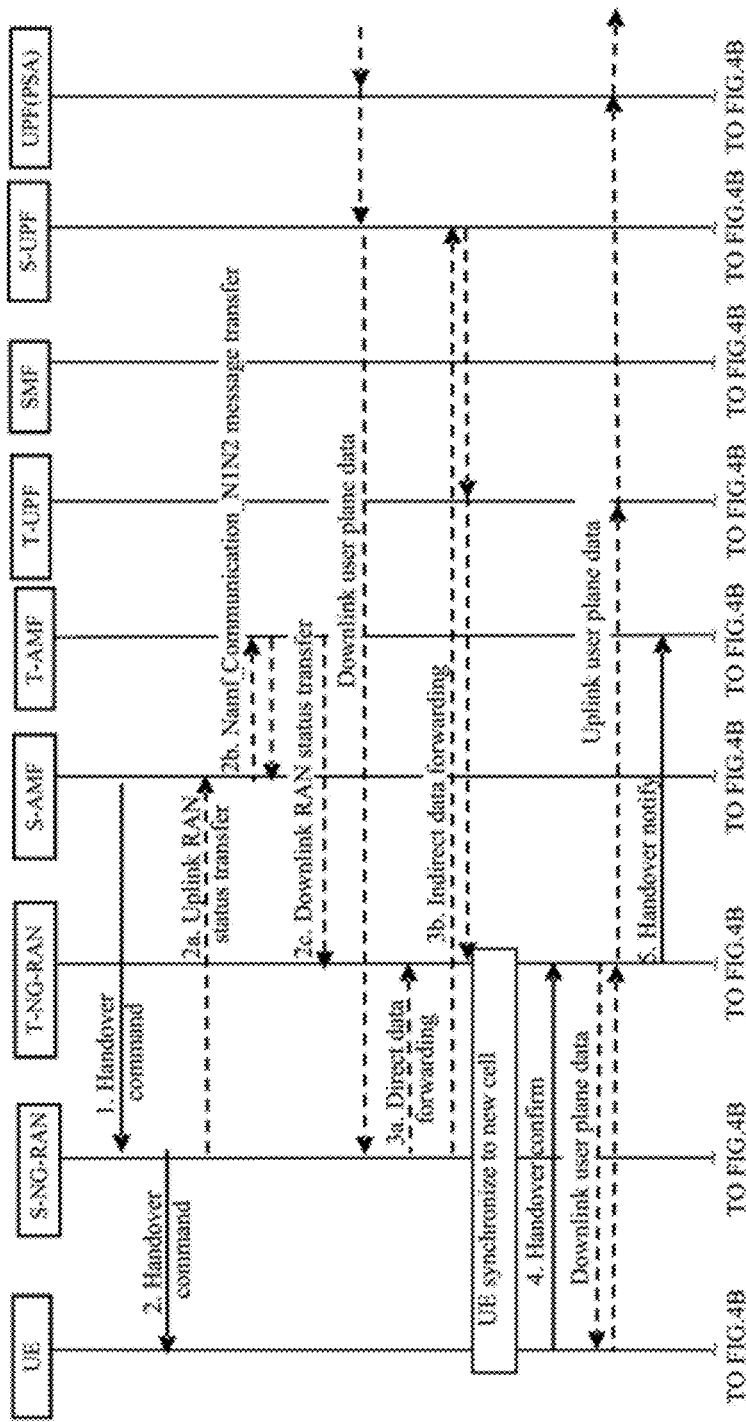
FIG. 4A and FIG. 4B are schematic diagrams of an execution stage of a handover based on the N2 interface provided by an embodiment of the present application.
Figure 4B:
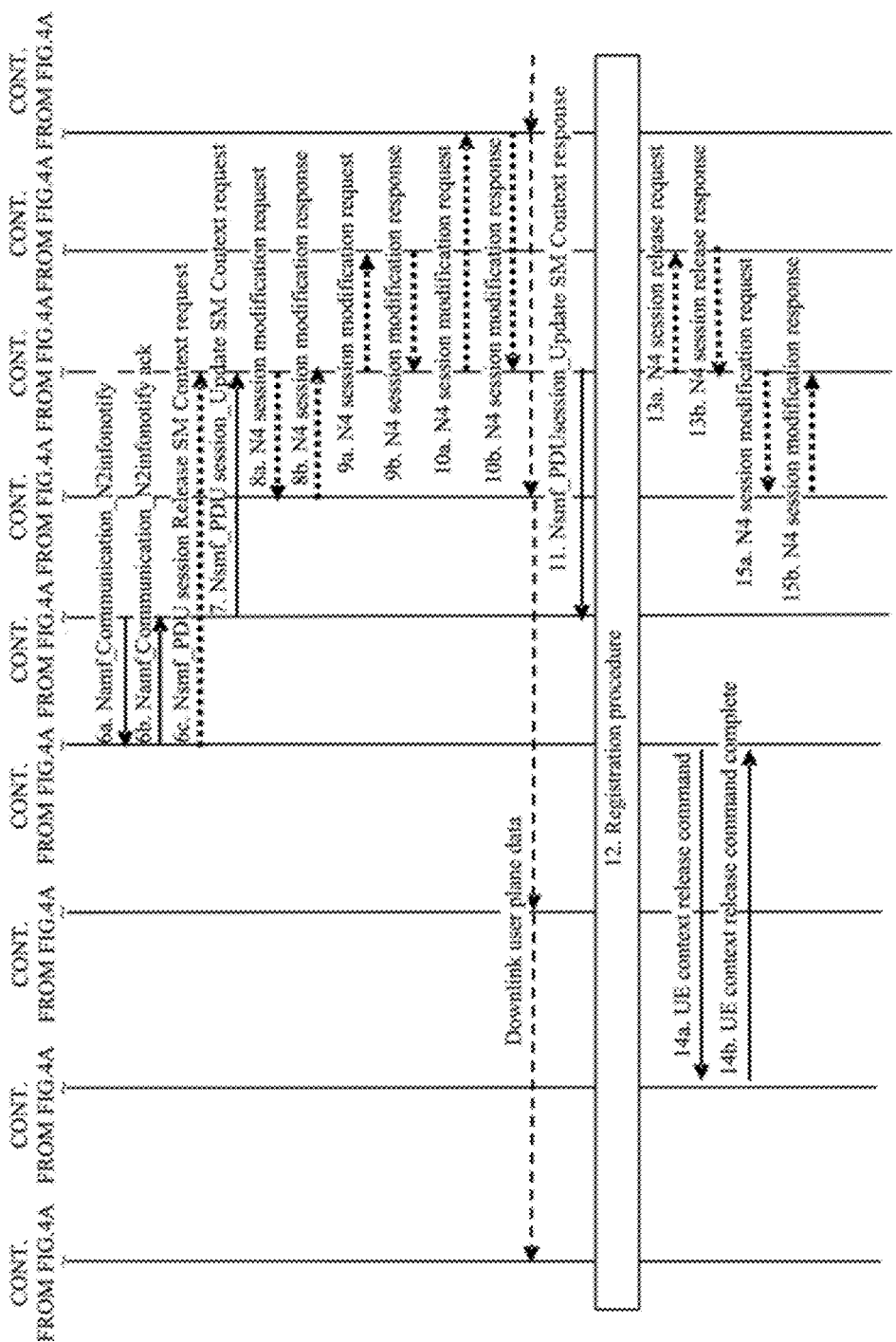

FIG. 4A and FIG. 4B are schematic diagrams of an execution stage of a handover based on the N2 interface provided by an embodiment of the present application. As shown in FIG. 4A and FIG. 4B, the AMF transmits a handover command (HO Command) message to the source base station to inform the source base station that the HO preparation stage has been completed. The S-RAN can execute Step 2 at any time, transmitting a Handover Command to the terminal device to trigger the terminal device to execute the air interface handover procedure to the target base station. After the air interface handover is completed, the terminal device transmits a Step-4 message to the T-RAN. The subsequent procedure is that the T-RAN interacts with the core network to update the target side session and convert the data transmission path.

Figure 5:
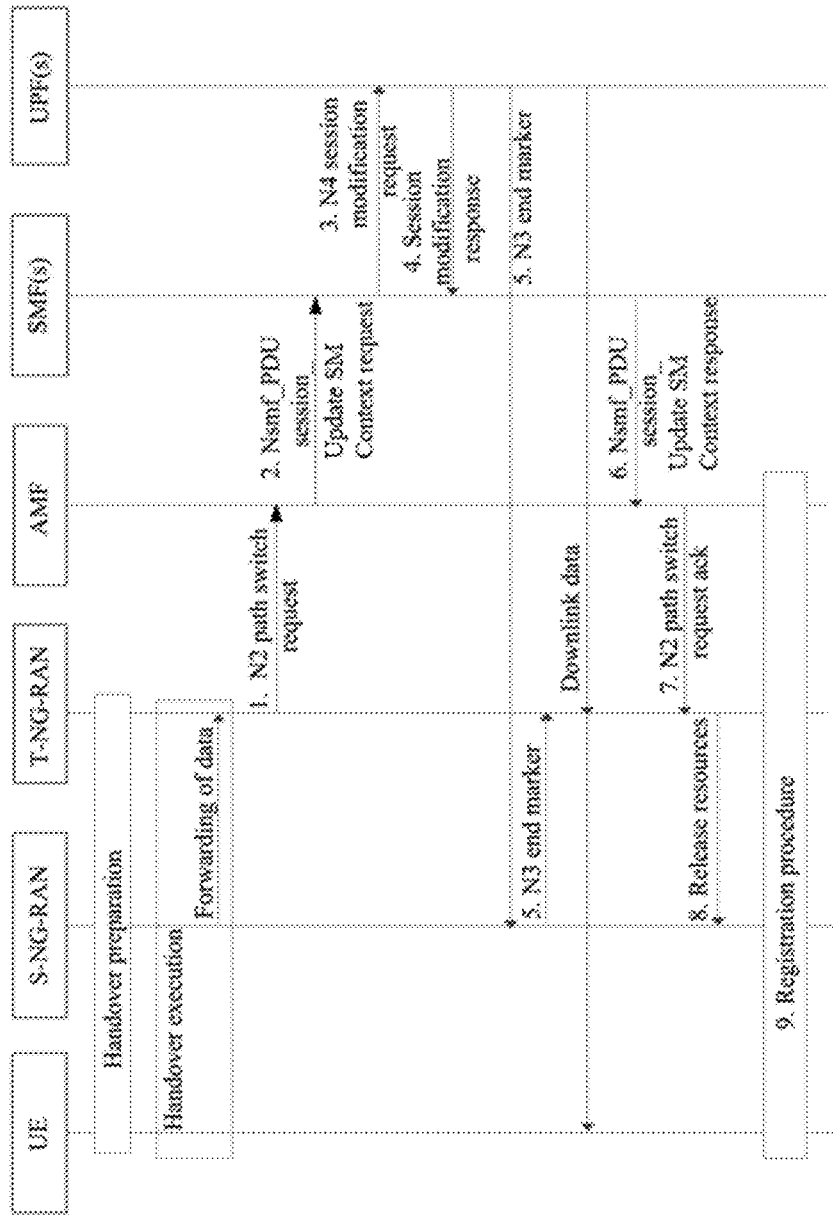
FIG. 5 is a schematic diagram of a handover process based on the Xn interface provided by an embodiment of the present application.

FIG. 5 is a schematic diagram of a handover process based on the Xn interface provided by an embodiment of the present application. As shown in FIG. 5, the handover process is divided into a preparation stage and an execution stage. The preparation stage is the handover preparation process shown in FIG. 5, which mainly includes that the S-RAN transmits a handover request message to the T-RAN. The T-RAN confirms whether it can support the establishment of the bearer according to its own situation, and replies to the S-RAN. The execution stage mainly includes the handover execution process shown in FIG. 5 and steps 1-8. At this time, the S-RAN transmits a handover request message to the terminal device, and the terminal device switches to the T-RAN according to the request message. After the handover is completed, the T-RAN transmits a notification message to the core network to allow the core network to change the data transmission path.

The service processing method provided by the embodiments of the present application may involve different entities such as the first base station, the terminal device, and the network side. Among them, the processing at the first base station side may include: the first base station obtains first indication information from a network side; where the first indication information includes at least one of the following: service support indication information; indication information of an effective area; indication information of a first behavior; status indication information of a terminal device; indication information of first behavior execution time; first behavior retry time.

Optionally, the first base station obtains the first indication information from a network side may be included in at least one of the following procedures: obtaining the first indication information replied by the network side in a registration procedure; obtaining the first indication information replied by the network side in a PDU session establishment/modification procedure; and obtaining the first indication information replied by the network side in a service request procedure. These procedures are only examples, and are not used to limit the technical solutions of the present application.

Figure 6:
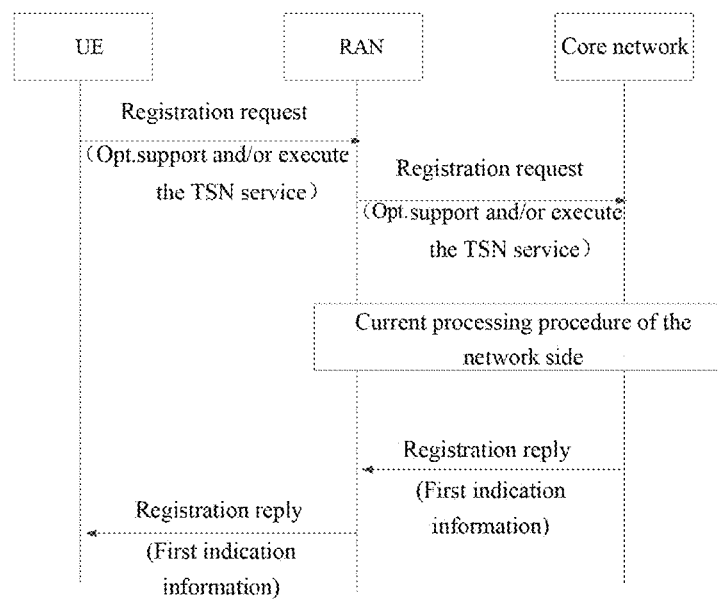
FIG. 6 is a schematic diagram of a registration procedure provided by an embodiment of the present application.

FIG. 6 is a schematic diagram of a registration procedure provided by an embodiment of the present application. As shown in FIG. 6, in the registration procedure, the terminal device may request, through the base station (i.e., the aforementioned first base station), the network side whether the first service, such as the TSN service, is supported and/or executed, and the network side may carry the first indication information in the registration reply.

Figure 7:
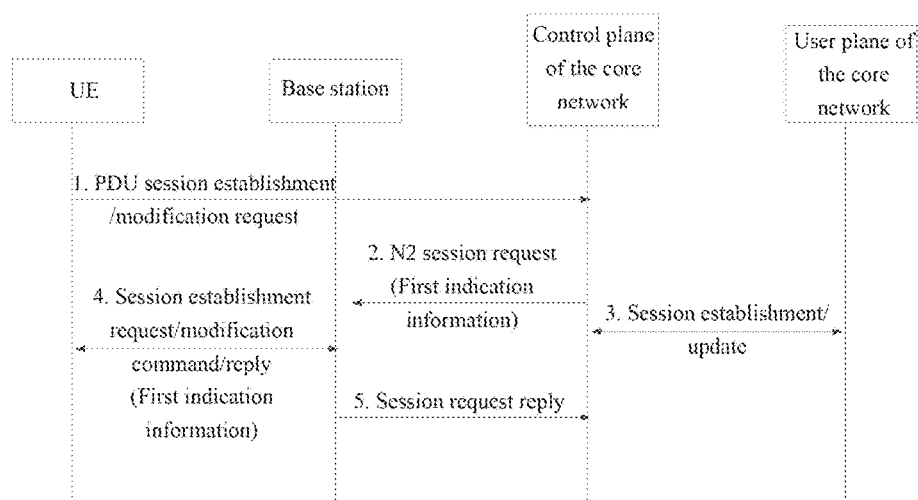
FIG. 7 is a schematic diagram of a PDU session establishment/modification procedure provided by an embodiment of the present application.

FIG. 7 is a schematic diagram of a PDU session establishment/modification procedure provided by an embodiment of the present application. As shown in FIG. 7, the first indication information can be carried in the N2 session request in step 2 and the session establishment request/modification command/reply in step 4, where the N2 SM Information and N1 SM Container parameters are included in step 2, and the N2 SM Information is transmitted to the base station for use, and the N1 SM Container is forwarded by the base station to the terminal device for use. The first indication information can be added in the N2 SM Information and the N1 SM Container and transmitted to the base station and/or terminal device.

Among them, the N2 SM Information may include: PDU session identity (Session ID), quality of service flow identity (QFI)(s), QoS configuration Profile(s), core network tunnel information (CN Tunnel Info), single network slice selection auxiliary information from the allowed network slice selection auxiliary information (S-NSSAI from the Allowed NSSAI), session aggregate maximum bit rate (Session-AMBR), PDU session type, user plane security enforcement information, integrity protection maximum data rate of the terminal device, etc., where S-NSSAI is the abbreviation of Single-Network Slice Selection Assistance Information.

The N1 SM Container may include: PDU session establishment accept, QoS rule(s) and QoS flow level and QoS parameters (if needed for the QoS flow(s) associated with the QoS rule(s)), selected session and service continuity node (selected SSC mode), S-NSSAI(s), data network name (DNN), allocated IPv4 address, interface identifier, Session-AMBR, selected PDU session type, reflective QoS timer (if available), proxy-call session control function entity (P-CSCF) address(es), etc., where SSC is the abbreviation of Session and Service Continuity.

It can be seen that the N1 SM Information and N2 SM Container contain QoS parameters, so the content of the first indication information can be transmitted to the base station and/or terminal device together with the QoS parameters.

The first indication information may include at least one of the following: service support indication information; indication information of an effective area; indication information of a first behavior; status indication information of a terminal device; indication information of first behavior execution time; first behavior retry time.

Among them, the service support indication information may include whether a first service is supported. The first base station can determine, according to the service support indication information, whether to execute the establishment or the modification of the quality of service flow corresponding to the first service. If the first service is supported, the first base station may accept the establishment or the modification of the quality of service flow corresponding to the first service. If the first service is not supported, the first base station may not accept the establishment or modification of the quality of service flow corresponding to the first service.

The indication information of the effective area may include an area supporting a first service, that is, an area in which the first service is executable. The first base station may determine, according to the effective area indication information, an area in which the first service is executable.

The area supporting the first service can be represented in a form of a cell identity (cell id) and/or a base station identity (gNodeB id) and/or a tracking area identity (TA id) and/or a registration area (RA), and/or in a granularity of public land mobile network (PLMN), and/or represented by a data network access identifier (DNAI).

Figure 8:
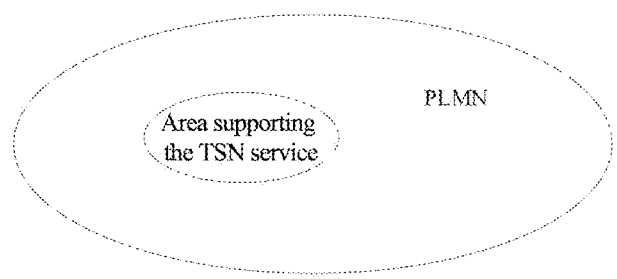
FIG. 8 is a schematic diagram of an area supporting a first service provided by an embodiment of the present application.

FIG. 8 is a schematic diagram of an area supporting a first service provided by an embodiment of the present application. As shown in FIG. 8, the first service may be a TSN service, and the area supporting the TSN service may be a part of a PLMN.

The indication information of the first behavior may include whether the execution of the first behavior is allowed. The first base station may determine, according to the indication information of the first behavior, whether the first behavior is executable. The indication granularity of the indication information of the first behavior may include at least one of the following: a terminal device, a session (per session), a data flow (per flow), etc.

The status indication information of the terminal device may include whether the terminal device is stationary or non-mobile. The first base station may determine, according to the status indication information of the terminal device, whether the first behavior is triggerable by the terminal device. For example, if the terminal device is stationary or non-mobile, the first behavior cannot be triggered.

The indication information of the first behavior execution time may include the time from a terminal device receiving a first behavior execution command transmitted by the first base station to initiating execution of the first behavior.

If it is determined that the first behavior is allowed to be executed according to the first indication information, when the first behavior needs to be executed, the first base station may transmit a first behavior execution command to the terminal device for the first behavior, and optionally, the command may carry the indication information of the first behavior execution time.

The first behavior may include a handover, which may include a handover within 5G system, a handover between systems, or a handover between base stations of different standards, etc. Accordingly, the first base station may transmit a handover command to the terminal device, which may be reconfiguration with synchronization in NR system and RRC Connection Reconfiguration including the mobility control information in LTE system. The terminal device executes the first behavior may include initiating random access to the second base station cell, obtaining cell synchronization, and transmitting a handover complete message, etc.

Figure 9A:
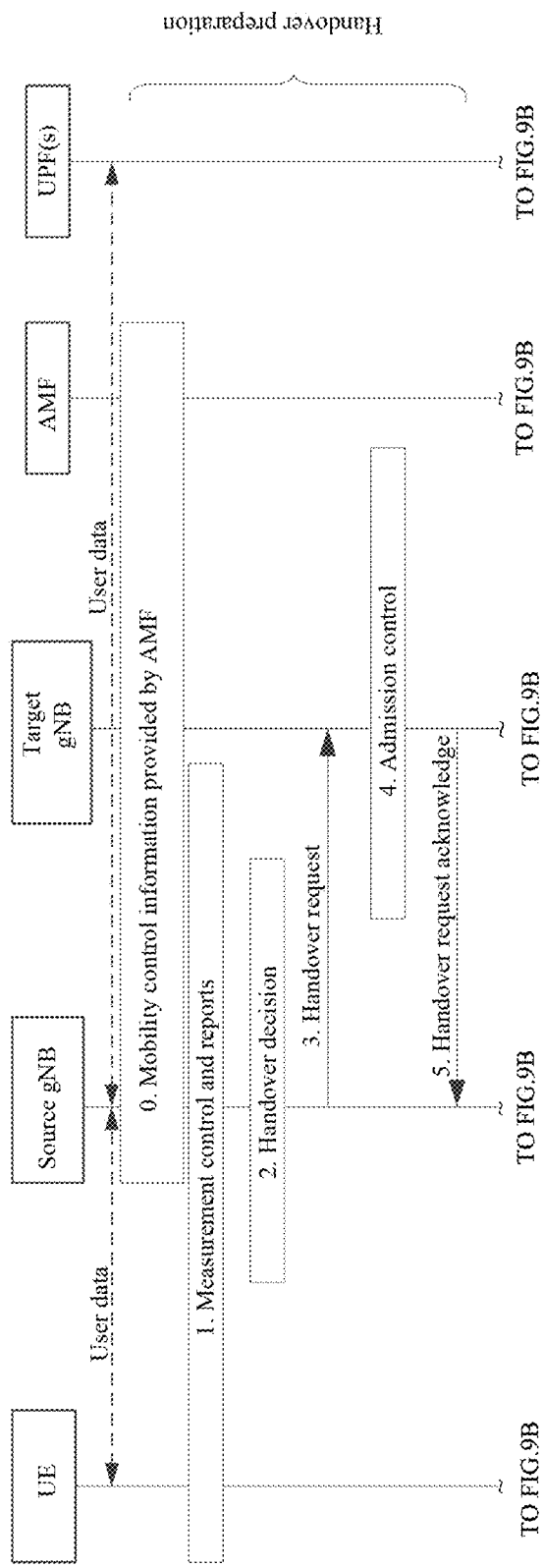
FIG. 9A and FIG. 9B are schematic diagrams of a handover process including a preparation stage and an execution stage provided by an embodiment of the present application.
Figure 9B:
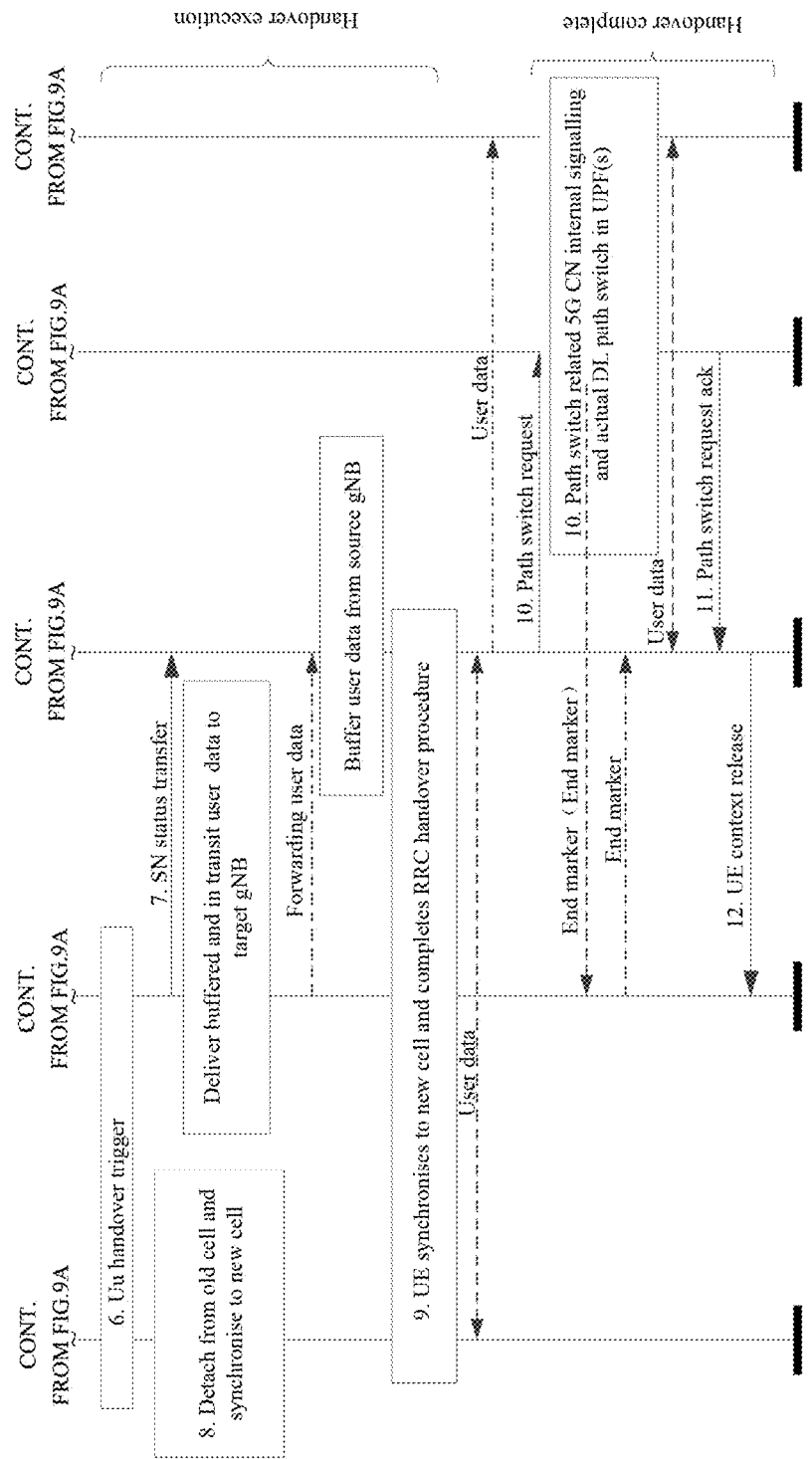

The handover may include a preparation stage and an execution stage, as shown in FIG. 9A and FIG. 9B, which are schematic diagrams of a handover process including a preparation stage and an execution stage provided by an embodiment of the present application.

Step-1 to Step-5 shown in FIG. 9A are the preparation stage. In which:

Step 1-Step 2: the source base station determines, according to the measurement report transmitted by the terminal device, to trigger the handover.

Step 3: the source base station transmits a HO Request message to the target base station, which contains a RRC Container. The RRC Container contains information necessary for the target base station to prepare for the handover, such as includes at least target cell ID, cell radio network temporary identifier (C-RNTI) assigned by the source base station to the terminal device, the radio resource management (RRM) configuration information includes inactive (Inactive) time of the terminal device and the basic configuration of access stratum (AS) (such as the antenna information, the downlink carrier frequency, etc.), mapping relationship between QoS Flow and data resource bearer (DRB) on the source base station, minimum system information on the source base station, the capability information of the terminal device under different RATs, and can also include the measurement information reported by the terminal device including the beam related information, etc.

Step 4: the target base station executes an access control, including whether to accept the transmitted QoS Flow and/or the DRB establishment.

Step 5: the target base station reserves the relevant resources of Layer 1/Layer 2, and transmits a handover request acknowledgement (HO Request Ack) message to the source base station, and the message contains a transparent container returned to the source base station.

Step 6 to Step 8 shown in FIG. 9B are the execution stage, in which:

Step 6: the source base station transmits a Uu Handover message to the terminal device, and the message includes the message of the target cell to be accessed (for example, it can include the Cell Id of the target cell, the new C-RNTI, the security algorithm identifier of the target base station, the random access channel (RACH) resource, the association relationship between the RACH resource and Signal Block (SS Block, Synchronization Signal Block), the association relationship between the RACH resource and the terminal device specific channel state information-reference signals (CSI-RS), common RAN resources, and the target cell scheduling unit (SIB) information, etc.).

Step 7: the source base station transmits a SN status transfer message to the target base station, and the message includes the sequence number information of the packet data convergence protocol (PDCP) layer of the data packet transmitted by the source base station to the terminal device before the handover.

Step 8: the terminal device synchronizes to the target cell and completes the RRC handover procedure.

Step 9 to the end shown in FIG. 9B is the handover completion stage. The signaling at this stage is used to notify the core network that the air interface handover has been completed, the core network changes the data transmission path from the source base station to the target base station (Path Switch), and the source base station releases the saved context information of the terminal device.

The first behavior execution command is Step-6, and the initiating the execution of the first behavior is Step-8-Step-9, so the time indicated in the indication information of the first behavior execution time is from receiving Step 6 to initiating Step 8.

The first behavior retry time may include the time to re-initiate a handover request when a failure indication replied by a second base station is obtained after the handover request is initiated to the second base station.

When the first base station transmits the handover request message to the second base station to be switched, it may only carries part of the data flow and/or the session information, including the data flow and/or the session information of the first service.

The first behavior may also include radio resource control (RRC) redirection. Accordingly, the first base station may transmit an RRC connection release message to the terminal device, and the first behavior executed by the terminal device may include initiating random access to the second base station cell and completing the RRC connection establishment request, etc.

In addition, the first base station may trigger a handover request to the second base station, for example, the first base station may transmit a handover request message to the second base station, and the first base station may obtain second indication information from the second base station, and the second indication information includes at least one of the following: incapable of establishing a first data stream and/or a session; incapable of guaranteeing a quality of service QoS parameter of the first data stream and/or the session; and the handover request being failed.

After obtaining the second indication information, the first base station may cancel the handover procedure or continue to execute the handover procedure.

Optionally, the first base station may obtain third indication information from the network side, and determine, according to the third indication information, to cancel the handover procedure or continue to execute the handover procedure. For example, the network side can directly indicate whether to cancel the handover procedure or continue to execute the handover procedure by using the third indication information.

If it is determined to cancel the handover procedure, the first base station may no longer trigger the handover procedure or transmit a handover request to the second base station within a first time. Among them, the first time can be obtained from the second base station and/or a network side and/or a static configuration, and the specific value is not limited.

If it is determined to cancel the handover procedure, the first base station may also transmit fourth indication information to the terminal device and/or the network side, and the fourth indication information is used to indicate that the terminal device stays within the coverage area of the first base station or show inability of guarantee a QoS of a first service (the service corresponding to the first data stream and/or session) after the terminal device leaves a coverage area of a current base station.

By the fourth indication information, the terminal device can know that the first service will be unable to guarantee if it leaves the coverage area of the first base station, for example, it can be displayed on the screen of the terminal device that the QoS of the first service will be unable to guarantee after leaving the coverage area of the current base station, so as to make the terminal device stay within the coverage area of the first base station as much as possible. Within the coverage area of the first base station, the data packet of the first service can be transmitted through the connection established between the terminal device and the first base station.

The content of the fourth indication information may be the same as or different from that of the second indication information. If different, the fourth indication information may include at least one of the following: incapable of executing a handover of a first service corresponding to the first data stream and/or the session; incapable of executing the first service at a second base station; capable of executing the first service only at the first base station, and so on.

The above first service can be the TSN service, but is not limited to TSN service, and is also applicable to other services, such as ultra reliability and low latency communication (URLLC) service, etc.

The above mainly describes the solutions described in the present application from the first base station side, and the following further describes the solutions described in the present application from the terminal device side and the network side respectively.

The processing at the terminal device side may include: the terminal device obtains first indication information from a network side; the first indication information includes at least one of the following: service support indication information; indication information of an effective area; indication information of a first behavior; status indication information of a terminal device; indication information of first behavior execution time; first behavior retry time.

Optionally, the terminal device obtains the first indication information from the network side may be included in at least one of the following procedure s: obtaining the first indication information replied by the network side in a registration procedure; obtaining the first indication information replied by the network side in a PDU session establishment/modification procedure; and obtaining the first indication information replied by the network side in a service request procedure. These procedures are only examples, and are not used to limit the technical solutions of the present application.

Among them, the service support indication information may include whether a first service is supported. The terminal device may determine, according to the service support indication information, whether the first service is executable, and whether the first service is executable may refer to whether the establishment or modification of the quality of service flow corresponding to the first service is executable.

The indication information of the effective area may include an area supporting a first service. The terminal device may determine, according to the indication information of the effective area, an area in which the first service is executable. The first service support area may be represented in a form of a cell id and/or a gNodeB id and/or a TA id and/or a RA, and/or in a granularity of PLMN, and/or represented by a DNAI.

The indication information of the first behavior may include whether an execution of the first behavior is allowed. The terminal device may determine, according to the indication information of the first behavior, whether the first behavior is executable. The indication granularity of the indication information of the first behavior may include at least one of the following: a terminal device, a session (per session), a data flow (per flow), etc.

The status indication information of the terminal device may include whether the terminal device is stationary or non-mobile. The terminal device may determine, according to the status indication information of the terminal device, whether the first behavior is triggerable by the terminal device. For example, if the terminal device is stationary or non-mobile, the first behavior cannot be triggered.

The indication information of the first behavior execution time may include the time from a terminal device receiving a first behavior execution command transmitted by the first base station to initiating execution of the first behavior.

The terminal device can obtain the first behavior execution command for the first behavior from the first base station, and the first behavior execution command can also carry the indication information of the first behavior execution time and/or target information (the base station connected to after executing the first behavior), etc.

The terminal device can determine whether to refuse to execute the first behavior according to the first indication information. For example, if the terminal device determines that it does not support the first behavior, it may refuse to execute the first behavior, or if the terminal device determines that the second base station is located outside the area supporting the first service, it may also refuse the first behavior.

If the terminal device determines to execute the first behavior, the first behavior can be triggered according to the indication of the indication information of the first behavior execution time, that is, after receiving the first behavior execution command transmitted by the first base station, the terminal device waits for the time indicated in the indication information of the first behavior execution time and then transmits the first message to execute the first behavior.

The first behavior may include a handover, which may include a handover within 5G system, a handover between systems, or a handover between base stations of different standards, etc. Accordingly, the first behavior execution command may include a handover command, and the execution of the first behavior may include the terminal device initiates random access to the second base station cell, obtains cell synchronization, and transmits a handover complete message, etc.

The first behavior retry time may include the time to re-initiate a handover request when a failure indication replied by a second base station is obtained after the handover request is initiated to the second base station.

The first behavior may also include a RRC redirection. Accordingly, the first behavior execution command may include an RRC connection release message, and the execution of the first behavior may include the terminal device initiates a random access to the second base station cell and completes the RRC connection establishment request, etc.

Since the first service such as the TSN may only be supported locally, when the terminal device moves out of the area supporting the first service, the terminal device and/or the network side may initiate the release, modification, suspension, etc. of the session and/or data flow corresponding to the first service. When the terminal device moves into the area supporting the first service, the terminal device and/or network side may initiate the establishment, modification, recovery, etc. of the session and/or data flow corresponding to the first service, and the session can be a PDU session.

For the terminal device, when the terminal device moves out of the effective area, for the first service, a first request message can be transmitted to the network side to trigger the network side to execute the first operation. When the terminal device moves into the effective area, for the first service, a second request message can be transmitted to the network side to trigger the network side to execute the second operation.

Among them, the first request message may carry object information and first operation information. The object information may include at least one of the following: a service identifier, data flow information, a session identifier, air interface bearer information, etc. The first operation may include at least one of the following: releasing the context corresponding to the object information; modifying the context corresponding to the object information; suspending or reserving the context corresponding to the object information, etc.

The second request message may carry object information and second operation information. The object information may include at least one of the following: a service identifier, data flow information, a session identifier, air interface bearer information, etc. The second operation may include at least one of the following: establishing the context corresponding to the object information; modifying the context corresponding to the object information; recovering the context corresponding to the object information, etc.

Optionally, the aforementioned service identifier may be an identifier for indicating a specific service, the data flow information may be QFI information, and the air interface bearer information may be a radio bearer identity (Radio Bearer Id), etc.

Taking the object information as the service identifier, the first operation is to release the context corresponding to the object information, and the second operation is to establish the context corresponding to the object information. When the terminal device moves out of the effective area, the terminal device can transmit a first request message to the network side, which can carry the service identifier and the context information corresponding to the releasing service identifier. Accordingly, the network side can release the context of the service corresponding to the service identifier. When the terminal device moves into the effective area, the terminal device may transmit a second request message to the network side, which may carry the service identifier and the context information corresponding to the establishing service identifier. Accordingly, the network side may establish the context of the service corresponding to the service identifier.

In addition, the terminal device may also obtain fourth indication information from a first base station, and the fourth indication information is used to indicate that the terminal device stays within a coverage area of the first base station or show inability of guarantee a QoS of a first service after the terminal device leaves the coverage area of a current base station, thus avoiding the terminal device from moving out of the coverage area of the first base station. That is to say, by the fourth indication information, the terminal device can know that the first service will be unable to guarantee if it leaves the coverage area of the first base station, so as to make the terminal device stay within the coverage area of the first base station as much as possible.

The fourth indication information may include at least one of the following: incapable of establishing a first data stream and/or a session; incapable of guaranteeing a quality of service QoS parameter of the first data stream and/or the session; the handover request being failed; incapable of executing a handover of a first service corresponding to the first data stream and/or the session; incapable of executing the first service at a second base station; capable of executing the first service only at the first base station.

The aforementioned first service can be the TSN service, but is not limited to the TSN service, and is also applicable to other services, such as URLLC service, etc.

The processing of the network side in the solutions described in the present application may include: the network side transmits first indication information to a terminal device and/or a first base station; and the first indication information may include at least one of the following: service support indication information; indication information of an effective area; indication information of a first behavior; status indication information of a terminal device; indication information of first behavior execution time; first behavior retry time.

The network side transmits the first indication information to the terminal device and/or the first base station may be included in at least one of the following procedure s: transmitting the first indication information to the terminal device and/or the first base station in the registration procedure; transmitting the first indication information to the terminal device and/or the first base station in the PDU session establishment/modification procedure; transmitting the first indication information to the terminal device and/or the first base station in the service request procedure. These procedures are only examples, and are not used to limit the technical solutions of the present application.

In addition, for the network side, if the terminal device moves out of the effective area, for the first service, the network side can trigger according to the first request message transmitted by the terminal device or actively trigger the first operation; if the terminal device moves into the effective area, for the first service, the network side can trigger according to the second request message transmitted by the terminal device or actively trigger the second operation.

Among them, the first request message may carry object information and first operation information. The object information may include at least one of the following: a service identifier, data flow information, a session identifier, air interface bearer information, etc. The first operation may include at least one of the following: releasing the context corresponding to the object information; modifying the context corresponding to the object information; suspending or reserving the context corresponding to the object information, etc.

The second request message may carry object information and second operation information. The object information may include at least one of the following: a service identifier, data flow information, a session identifier, air interface bearer information, etc. The second operation may include at least one of the following: establishing the context corresponding to the object information; modifying the context corresponding to the object information; recovering the context corresponding to the object information, etc.

It should be noted that the aforementioned method embodiments are expressed as a series of action combinations for simple description, but those skilled in the art should know that the present application is not limited by the described action sequence, because some steps can be carried out in other sequences or simultaneously according to the present application. Secondly, those skilled in the art should also know that the embodiments described in the specification are all preferred embodiments, and the actions and modules involved are not necessarily required for the present application.

In addition, in the above embodiments, descriptions of different entity sides (such as the first base station side, the terminal device side, and the network side) have different emphases. For parts not detailed in one certain entity side, please refer to the relevant descriptions in other entity sides.

In a word, with the scheme described in the present application, the first base station can obtain the first indication information from the network side, which may include various indication information such as service support indication information and/or indication information of an effective area and/or indication information of a first behavior and/or status indication information of a terminal device and/or indication information of first behavior execution time, thus the effective area of the service is effectively defined, which provides great help for the reasonable deployment and the handover control of the service. Moreover, when the first base station transmits the handover request message to the target base station and/or the core network, it can only carry part of the data flow and/or the session information, and it is not necessary to request the handover of all the current bearers, thus improving the handover speed and efficiency.

The above is the introduction of the method embodiment, and the solution described in the present application will be further described below by the device embodiment.

Figure 10:
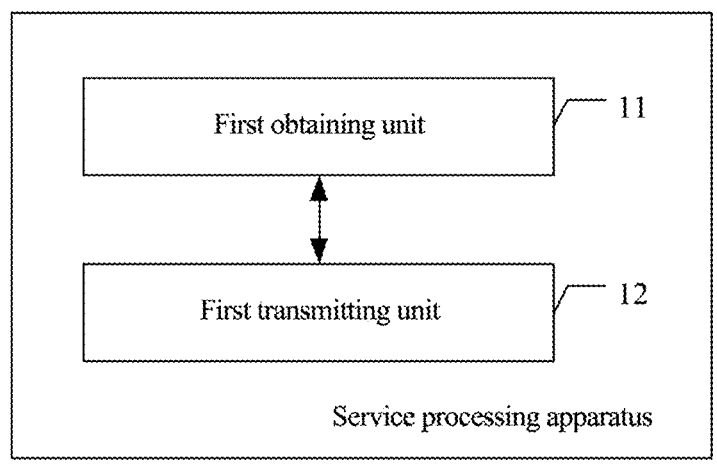
FIG. 10 is a first schematic structural diagram of a service processing apparatus provided by an embodiment of the present application.

FIG. 10 is a first schematic structural diagram of a service processing apparatus provided by an embodiment of the present application. The service processing apparatus described in the present embodiment may be applied in a base station, including: a first obtaining unit 11, configured to obtain first indication information from a network side; where the first indication information includes at least one of the following: service support indication information; indication information of an effective area; indication information of a first behavior; status indication information of a terminal device; indication information of first behavior execution time; first behavior retry time.

The first obtaining unit 11 obtains the first indication information from a network side may be included in at least one of the following procedures: obtaining the first indication information replied by the network side in a registration procedure; obtaining the first indication information replied by the network side in a PDU session establishment/modification procedure; obtaining the first indication information replied by the network side in a service request procedure.

Among them, the service support indication information may include whether a first service is supported. The first obtaining unit 11 may determine, according to the service support indication information, whether to execute establishment or modification of a quality of service flow corresponding to the first service.

The indication information of the effective area may include an area supporting a first service. The first obtaining unit 11 may determine, according to the indication information of the effective area, an area in which the first service is executable. The first service support area may be represented in the form of a cell id and/or a gNodeB id and/or a TA id and/or a RA, and/or in a granularity of PLMN, and/or represented by a DNAI.

The indication information of the first behavior may include whether an execution of the first behavior is allowed. The first obtaining unit 11 may determine, according to the indication information of the first behavior, whether the first behavior is executable. The indication granularity of the indication information of the first behavior may include at least one of the following: a terminal device, a session, a data flow.

The status indication information of the terminal device may include whether the terminal device is stationary or non-mobile. The first obtaining unit 11 may determine, according to the status indication information of the terminal device, whether the first behavior is triggerable by the terminal device.

The indication information of the first behavior execution time may include time from a terminal device receiving a first behavior execution command transmitted by the first base station to initiating execution of the first behavior.

The service processing apparatus shown in FIG. 10 may further include a first transmitting unit 12, configured to transmit a first behavior execution command to the terminal device for the first behavior.

The first behavior may include a handover. Accordingly, the first behavior execution command may include a handover command. And the execution of the first behavior may include the terminal device initiates random access to a second base station cell, obtains cell synchronization, and transmits a handover complete message.

The first behavior retry time may include the time to re-initiate a handover request when a failure indication replied by a second base station is obtained after the handover request is initiated to the second base station.

When the first transmitting unit 12 transmits the handover request message to the second base station and/or the core network, it may only carries part of the data flow and/or session information, including the data flow and/or session information of the first service.

The first behavior may also include a RRC redirection. Accordingly, the first behavior execution command may include an RRC connection release message, and the execution of the first behavior may include the terminal device initiates a random access to a second base station cell and completes a RRC connection establishment request.

The above first service may include the TSN service and/or the URLLC service, etc.

Figure 11:
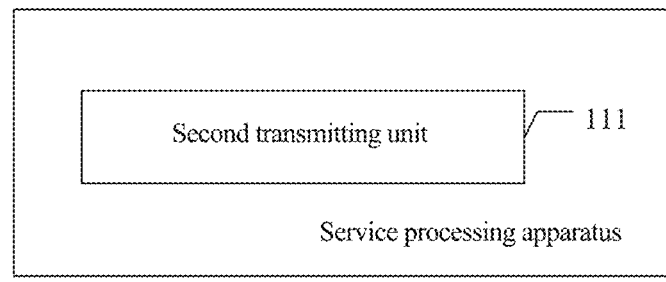
FIG. 11 is a second schematic structural diagram of a service processing apparatus provided by an embodiment of the present application.

FIG. 11 is a second schematic structural diagram of a service processing apparatus provided by an embodiment of the present application. The service processing apparatus described in the present embodiment may be applied in a base station, including: a second transmitting unit 111, configured to only carry part of the data flow and/or session information when transmitting a handover request message to a target base station and/or a core network.

Figure 12:
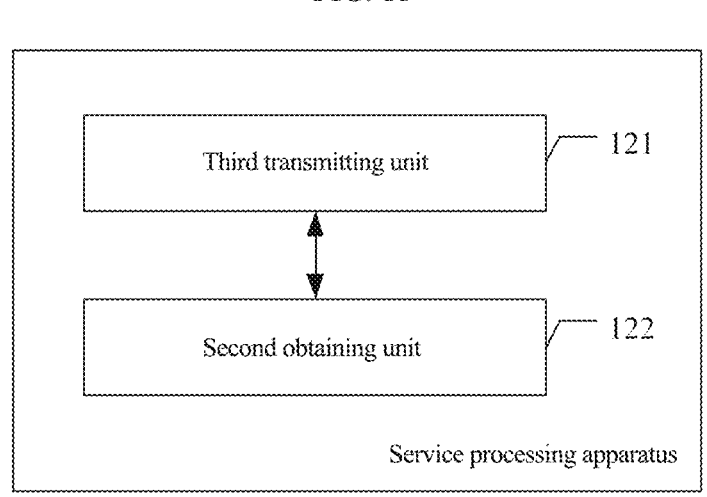
FIG. 12 is a third schematic structural diagram of a service processing apparatus provided by an embodiment of the present application.

FIG. 12 is a third schematic structural diagram of a service processing apparatus provided by an embodiment of the present application. The service processing apparatus described in the present embodiment may be applied in a base station, including: a third transmitting unit 121 and a second obtaining unit 122.

The third transmitting unit 121 is configured to trigger a handover request to the second base station, such as transmitting a handover request message to the second base station.

The second obtaining unit 122 is configured to obtain second indication information from the second base station, and the second indication information includes at least one of the following: incapable of establishing a first data stream and/or a session; incapable of guaranteeing a quality of service QoS parameter of the first data stream and/or the session; and a handover request being failed.

After obtaining the second indication information, the second obtaining unit 122 may cancel the handover procedure or continue to execute the handover procedure.

Optionally, the second obtaining unit 122 may obtain third indication information from the network side, and determine, according to the third indication information, to cancel the handover procedure or continue to execute the handover procedure.

If it is determined to cancel the handover procedure, the third transmitting unit 121 may no longer trigger the handover procedure or transmit a handover request to the second base station within the first time. The first time can be obtained from the second base station and/or the network side and/or the static configuration.

If it is determined to cancel the handover procedure, the third transmitting unit 121 may also transmit fourth indication information to the terminal device and/or the network side. The fourth indication information is used to indicate that the terminal device stays within the coverage area of the first base station (the base station described in this embodiment) or shows inability of guarantee a QoS of a first service after the terminal device leaves a coverage area of a current base station. The content of the fourth indication information may be the same as or different from that of the second indication information. If different, the content of the fourth indication information may include at least one of the following: incapable of executing a handover of a first service corresponding to the first data stream and/or the session; incapable of executing the first service at a second base station; capable of executing the first service only at the first base station.

Figure 13:
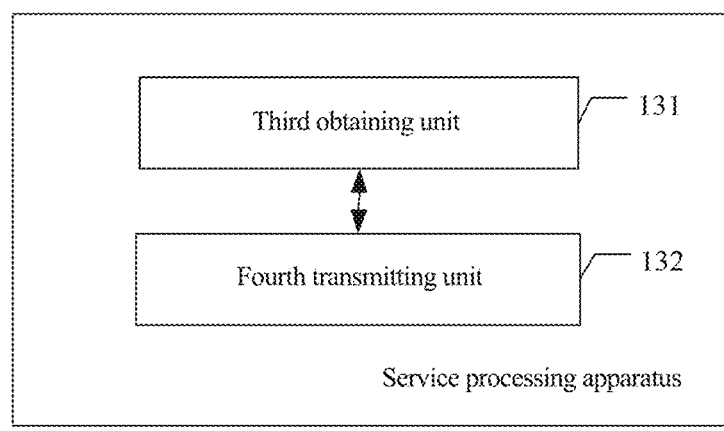
FIG. 13 is a fourth schematic structural diagram of a service processing apparatus provided by an embodiment of the present application.

FIG. 13 is a fourth schematic structural diagram of a service processing apparatus provided by an embodiment of the present application. The service processing apparatus described in the present embodiment may be applied in a terminal device, including: a third obtaining unit 131, configured to obtain first indication information from a network side; where the first indication information includes at least one of the following: service support indication information; indication information of an effective area; indication information of a first behavior; status indication information of a terminal device; indication information of first behavior execution time; first behavior retry time.

The third obtaining unit 131 obtains the first indication information from a network side may be included in at least one of the following procedures: obtaining the first indication information replied by the network side in the registration procedure; obtaining the first indication information replied by the network side in the PDU session establishment/modification procedure; obtaining the first indication information replied by the network side in the service request procedure.

Among them, the service support indication information may include whether a first service is supported. The third obtaining unit 131 may determine, according to the service support indication information, whether the first service is executable, and whether the first service is executable may refer to whether the establishment or the modification of the quality of service flow corresponding to the first service is executable.

The indication information of the effective area may include an area supporting a first service. The third obtaining unit 131 may determine, according to the indication information of the effective area, an area in which the first service is executable. The first service support area may be represented in the form of a cell id and/or a gNodeB id and/or a TA id and/or a RA, and/or in a granularity of PLMN as granularity, and/or represented by a DNAI.

The indication information of the first behavior may include whether an execution of the first behavior is allowed. The third obtaining unit 131 may determine, according to the indication information of the first behavior, whether the first behavior is executable. The indication granularity of the first behavior indication information may include at least one of the following: a terminal device, a session, a data flow.

The status indication information of the terminal device may include whether the terminal device is stationary or non-mobile. The third obtaining unit 131 may determine, according to the status indication information of the terminal device, whether the first behavior is triggerable by the terminal device.

The third obtaining unit 131 may also obtain a first behavior execution command for the first behavior from the first base station, and determine, according to the first indication information, whether to refuse to execute the first behavior. If the third obtaining unit 131 determines to execute the first behavior, the first behavior may be triggered according to the indication of the indication information of the first behavior execution time.

The indication information of the first behavior execution time may include the time from a terminal device receiving a first behavior execution command transmitted by the first base station to initiating execution of the first behavior.

The first behavior may include a handover. Accordingly, the first behavior execution command may include a handover command. And the execution of the first behavior may include the terminal device initiates random access to a second base station cell, obtains cell synchronization, and transmits a handover complete message.

The first behavior retry time may include the time to re-initiate a handover request when a failure indication replied by a second base station is obtained after the handover request is initiated to the second base station.

The first behavior may also include a RRC redirection. Accordingly, the first behavior execution command may include an RRC connection release message, and the execution of the first behavior may include the terminal device initiates a random access to a second base station cell and completes a RRC connection establishment request.

The service processing apparatus shown in FIG. 13 may further include a fourth transmitting unit 132, configured to transmit a first request message for the first service to the network side to trigger the network side to execute a first operation, when the terminal device moves out of the effective area, and transmit a second request message for the first service to the network side to trigger the network side to execute a second operation, when the terminal device moves into the effective area.

The first request message may carry object information and first operation information. The object information may include at least one of the following: a service identifier, data flow information, a session identifier, air interface bearer information. The first operation may include at least one of the following: releasing the context corresponding to the object information; modifying the context corresponding to the object information; suspending or reserving the context corresponding to the object information.

The second request message may carry object information and second operation information. The object information may include at least one of the following: a service identifier, data flow information, a session identifier, air interface bearer information. The second operation may include at least one of the following: establishing the context corresponding to the object information; modifying the context corresponding to the object information; recovering the context corresponding to the object information.

Figure 14:
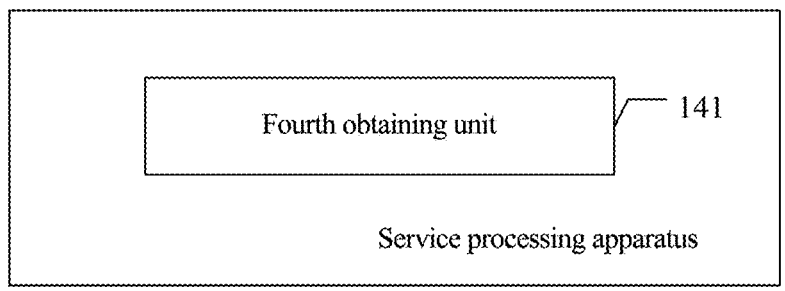
FIG. 14 is a fifth schematic structural diagram of a service processing apparatus provided by an embodiment of the present application.

FIG. 14 is a fifth schematic structural diagram of a service processing apparatus provided by an embodiment of the present application. The service processing apparatus described in the present embodiment may be applied in a terminal device, including: a fourth obtaining unit 141, configured to obtain fourth indication information from the first base station, where the fourth indication information is used to indicate that the terminal device stays within a coverage area of the first base station or show inability of guarantee a QoS of a first service after the terminal device leaves the coverage area of a current base station.

Among them, the fourth indication information may include at least one of the following: incapable of establishing a first data stream and/or a session; incapable of guaranteeing a quality of service QoS parameter of the first data stream and/or the session; a handover request being failed; incapable of executing a handover of a first service corresponding to the first data stream and/or the session; incapable of executing the first service at a second base station; capable of executing the first service only at the first base station.

Figure 15:
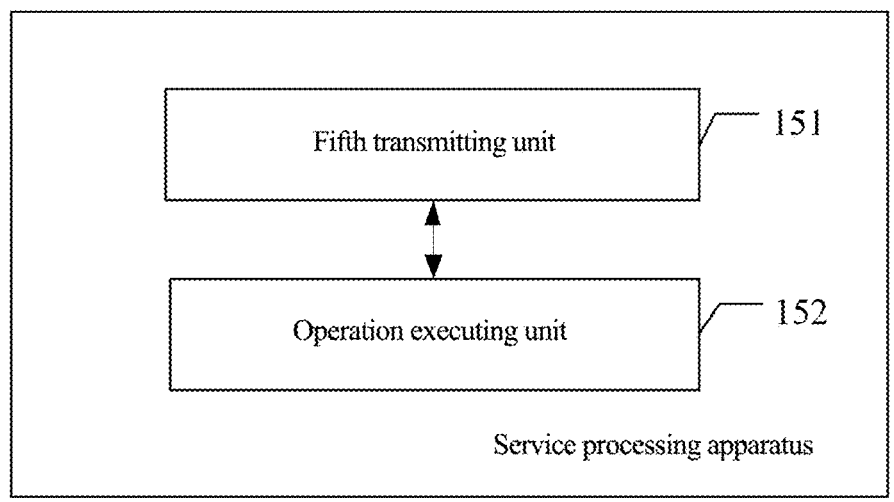
FIG. 15 is a sixth schematic structural diagram of a service processing apparatus provided by an embodiment of the present application.

FIG. 15 is a sixth schematic structural diagram of a service processing apparatus provided by an embodiment of the present application. The service processing apparatus described in the present embodiment may be applied in a network side, including: a fifth transmitting unit 151, configured to transmit first indication information to a terminal device and/or a first base station; where the first indication information includes at least one of the following: service support indication information; indication information of an effective area; indication information of a first behavior; status indication information of a terminal device; indication information of first behavior execution time; first behavior retry time.

Among them, transmitting the first indication information to the terminal device and/or the first base station may be included in at least one of the following procedures: transmitting the first indication information to the terminal device and/or the first base station in the registration procedure; transmitting the first indication information to the terminal device and/or the first base station in the PDU session establishment/modification procedure; transmitting the first indication information to the terminal device and/or the first base station in the service request procedure. These procedures are only examples, and are not used to limit the technical solutions of the present application.

The service processing apparatus shown in FIG. 15 may further include an operation executing unit 152, configured to trigger according to a first request message transmitted by the terminal device or actively trigger the first operation for the first service when the terminal device moves out of the effective area, and trigger according to a second request message transmitted by the terminal device or actively trigger the second operation for the first service when the terminal device moves into the effective area.

The first request message may carry object information and first operation information. The object information may include at least one of the following: a service identifier, data flow information, a session identifier, air interface bearer information. The first operation may include at least one of the following: releasing the context corresponding to the object information; modifying the context corresponding to the object information; suspending or reserving the context corresponding to the object information.

The second request message may carry object information and second operation information. The object information may include at least one of the following: a service identifier, data flow information, a session identifier, air interface bearer information. The second operation may include at least one of the following: establishing the context corresponding to the object information; modifying the context corresponding to the object information; recovering the context corresponding to the object information.

For the specific working mode of the above device embodiments, please refer to the relevant description in the above method embodiments and will not be repeated.

Figure 16:
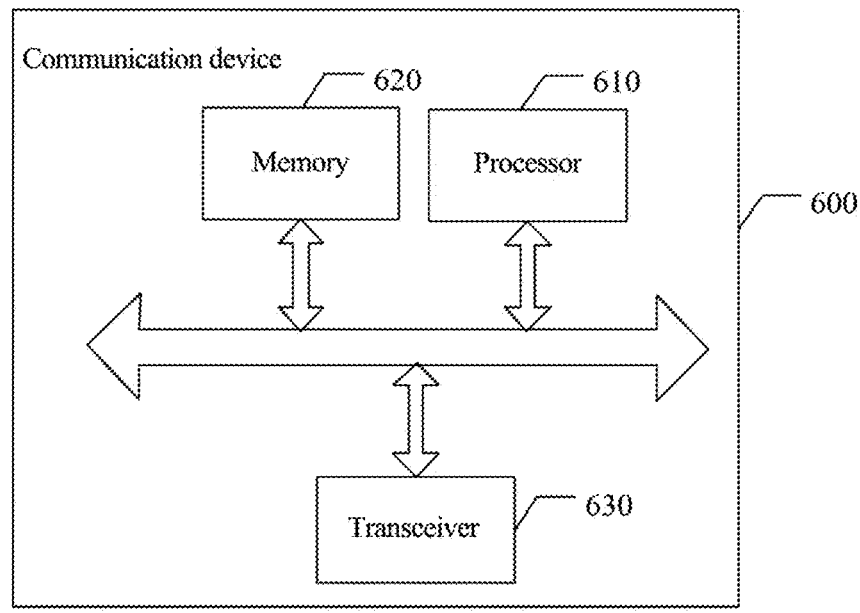
FIG. 16 is a schematic structural diagram of a communication device 600 provided by an embodiment of the present application.

FIG. 16 is a schematic configuration diagram of a communication device 600 provided by an embodiment of the present application. The communication device 600 shown in FIG. 16 includes a processor 610, and the processor 610 can call and run a computer program from a memory 620 to implement the method in the embodiments of the present application.

Optionally, as shown in FIG. 16, the communication device 600 may also include a memory 620. Among them, the processor 610 can call and run a computer program from the memory 620 to implement the method in the embodiments of the present application.

The memory 620 may be a separate device independent of the processor 610 or may be integrated in the processor 610.

Optionally, as shown in FIG. 16, the communication device 600 may further include a transceiver 630, and the processor 610 may control the transceiver 630 to communicate with other device, specifically, may transmit information or data to other devices, or receive information or data transmitted by other devices.

Among them, the transceiver 630 may include a transmitter and a receiver. The transceiver 630 may further include an antenna, and the number of the antenna may be one or multiple.

Optionally, the communication device 600 may be the network device in an embodiment of the present application, and the communication device 600 may implement corresponding processes implemented by the network device in each method of the embodiments of the present application. For the sake of brevity, details will not be described here again.

Optionally, the communication device 600 may be the terminal device in an embodiment of the present application, and the communication device 600 may implement corresponding processes implemented by the terminal device in each method of the embodiments of the present application. For the sake of brevity, details will not be described here again.

Figure 17:
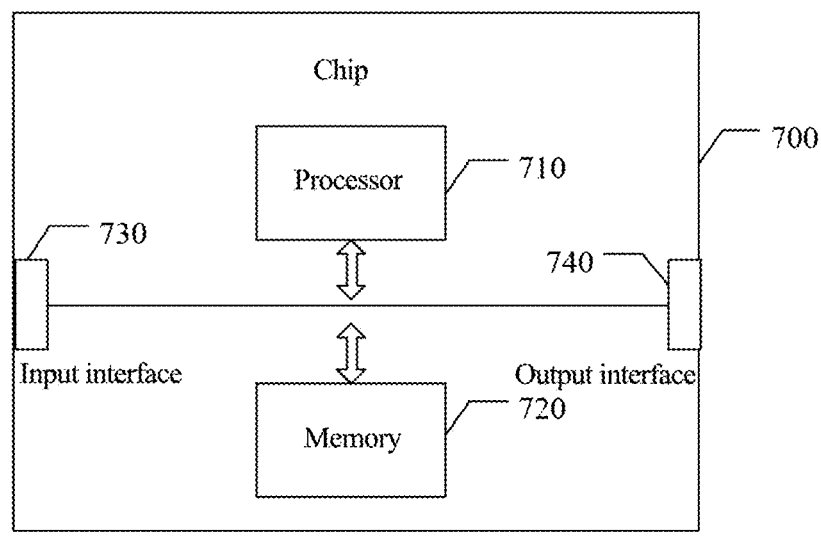
FIG. 17 is a schematic structural diagram of a chip 700 provided by an embodiment of the present application.

FIG. 17 is a schematic structural diagram of a chip 700 provided by an embodiment of the present application. The chip 700 shown in FIG. 17 includes a processor 710, where the processor 710 may call and run a computer program from a memory to implement the methods in the embodiments of the present application.

Optionally, as shown in FIG. 17, the chip 700 may further include a memory 720. Among them, the processor 710 can call and run a computer program from the memory 720 to implement the method in the embodiments of the present application.

The memory 720 may be a separate device independent of the processor 710 or may be integrated in the processor 710.

Optionally, the chip 700 may further include an input interface 730. Among them, the processor 710 may control the input interface 730 to communicate with other devices or chips, specifically, may obtain the information or data transmitted by other devices or chips.

Optionally, the chip 700 may further include an output interface 740. Among them, the processor 710 may control the output interface 740 to communicate with other devices or chips, specifically, may output the information or data to other devices or chips.

Optionally, the chip may be applied in the network device in the embodiments of the present application, and the chip may implement corresponding processes implemented by the network device in various methods of the embodiments of the present application. For the sake of brevity, details will not be described here again.

Optionally, the chip may be applied in the mobile terminal/the terminal device in the embodiments of the present application, and the chip may implement corresponding processes implemented by the mobile terminal/the terminal device in various methods of the embodiments of the present application. For the sake of brevity, details will not be described here again.

It should be understood that the chip mentioned in the embodiment of the present application may also be termed as a system-level chip, a system chip, a chip system, or a system-on-chip, etc.

Figure 18:
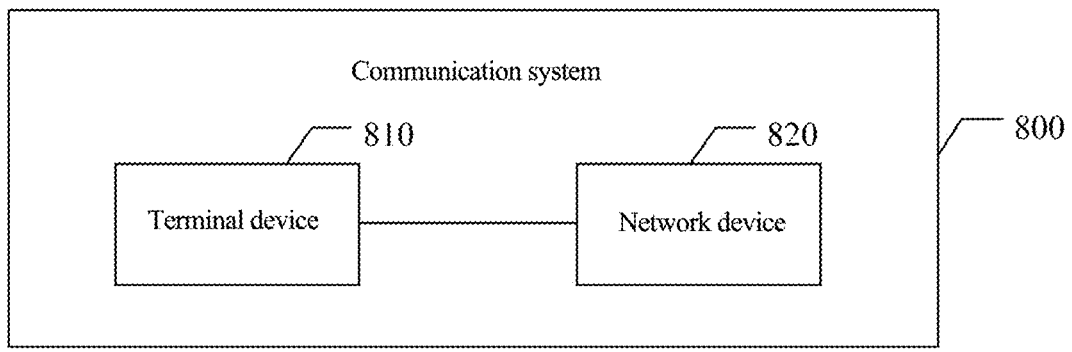
FIG. 18 is a schematic block diagram of a communication system 800 provided by an embodiment of the present application.

FIG. 18 is a schematic block diagram of a communication system 800 provided by an embodiment of the present application. As shown in FIG. 18, the communication system 800 includes a terminal device 810 and a network device 820.

Among them, the terminal device 810 may be configured to implement corresponding functions implemented by the terminal device in the above methods, the network device 820 may be configured to implement corresponding functions implemented by the network device in the above methods. For the sake of brevity, details will not be described here again.

It should be understood that the processor of the embodiments of the present application may be an integrated circuit chip with signal processing capabilities. In the implementation process, each step of the above method embodiment may be completed by a hardware integrated logic circuit and/or instructions in the form of software in the processor. The above processor may be a general purpose processor, a digital signal processor (DSP), an application specific integrated circuit (ASIC), a field programmable gate array (FPGA) or other programmable logic device, discrete gate or transistor logic device, discrete hardware component, etc. Various methods, steps, and logical block diagrams disclosed in the embodiments of the present application may be implemented or executed. The general purpose processor may be a microprocessor or the processor may also be any conventional processor, etc. The steps of the method disclosed in conjunction with the embodiments of the present application may be directly embodied as being performed and completed by a hardware decoding processor, or may be performed and completed by a combination of hardware and software modules in the decoding processor. The software module may be located in a storage medium mature in the art, such as a random access memory, a flash memory, a read only memory, a programmable read only memory, an electrically erasable programmable memory, a register, or the like. The storage medium is located in the memory. The processor reads information in the memory and completes the steps in the above mentioned method embodiments in conjunction with its hardware.

It could be understood that the memory in the embodiment of the present application may be a volatile memory or a non-volatile memory, or may include both the volatile memory and the non-volatile memory. Among them, the non-volatile memory may be a read-only memory (ROM), a programmable read only memory (PROM), an erasable programmable read only memory (EPROM), an electrically erasable programmable read only memory (EEPROM) or a flash memory. The volatile memory may be a random access memory (RAM), which is used as an external cache. By way of example but not restrictive illustration, many forms of RAM are available, for example, the memory in the embodiment of the present application may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM) and a direct rambus random access memory (DR RAM). It should be noted that the memory of the systems and methods described herein is intended to include, but is not limited to, these and any other suitable types of memory.

An embodiment of the present application further provides a computer-readable storage medium for storing a computer program.

Optionally, the computer-readable storage medium may be applied to the network device in the embodiments of the present application, and the computer program enables a computer to perform corresponding processes implemented by the network device in various methods of the embodiments of the present application. For the sake of brevity, details will not be described here again.

Optionally, the computer-readable storage medium may be applied to the mobile terminal/the terminal device in the embodiments of the present application, and the computer program enables a computer to perform corresponding processes implemented by the mobile terminal/the terminal device in various methods of the embodiments of the present application. For the sake of brevity, details will not be described here again.

An embodiment of the present application further provides a computer program product including computer program instructions.

Optionally, the computer program product may be applied to the network device in the embodiments of the present application, and the computer program instructions enable a computer to perform corresponding processes implemented by the network device in various methods of the embodiments of the present application. For the sake of brevity, details will not be described here again.

Optionally, the computer program product may be applied to the mobile terminal/the terminal device in the embodiments of the present application, and the computer program instructions enable a computer to perform corresponding processes implemented by the mobile terminal/the terminal device in various methods of the embodiments of the present application. For the sake of brevity, details will not be described here again.

An embodiment of the present application further provides a computer program.

Optionally, the computer program may be applied to the network device in the embodiments of the present application. The computer program which, when running on a computer, enables the computer to perform corresponding processes implemented by the network device in various methods of the embodiments of the present application. For the sake of brevity, details will not be described here again.

Optionally, the computer program may be applied to the mobile terminal/the terminal device in the embodiments of the present application. The computer program which, when running on a computer, enables the computer to perform corresponding processes implemented by the mobile terminal/the terminal device in various methods of the embodiments of the present application. For the sake of brevity, details will not be described here again.

It may be known to those skilled in the art that, the units and the algorithm steps of various examples that are described with reference to the embodiments disclosed herein may be implemented by electronic hardware or a combination of computer software and electronic hardware. The situation whether these functions are performed by hardware or software depends on specific applications and design constraints of the technical solutions. Those skilled in the art may implement the described functions by using different methods for each specific application, but such implementation should not be regarded as going beyond the scope of the embodiments of the present application.

It may be clearly understood by those skilled in the art that, for the purpose of convenient and brief description, reference may be made to corresponding processes in the foregoing method embodiments for detailed working processes of the above mentioned and described systems, apparatuses and units, and details will not be described here again.

In several embodiments provided in the present application, it should be understood that the disclosed systems, apparatuses, and methods may be implemented in other manners. For example, the device embodiment described above is only schematic. For example, the division of the units is merely a division of logical functions and there may be other divisions during actual implementations. For example, multiple units or components may be combined or integrated into another system, or some features may be omitted or not executed. On the other hand, the displayed or discussed mutual couplings or direct couplings or communication connections may be the indirect couplings or communication connections through some interfaces, apparatuses or units, which may be in electronic, mechanical, or other forms.

The units described as separate parts may or may not be physically separate, and the components displayed as units may or may not be physical units, that is, may be located in one position, or may be distributed on multiple network units. A part or all of the units may be selected according to actual needs to achieve the purpose of the embodiments of the present application.

In addition, the functional units in each embodiment of the present application may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of this application essentially or the part that contributes to the existing technology or the part of the technical solution can be embodied in the form of a software product. The computer software product is stored in a storage medium and includes a number of instructions to enable a computer device (which may be a personal computer, a server, or a network device, etc.) to perform all or part of the steps of the methods described in the various embodiments of the present application. The storage media include: U disk, mobile hard disk, ROM, RAM, magnetic disk or optical disk and other media that can store program code.

The above contents are merely specific implementations of the present application; however, the scope claimed in the embodiments of the present application is not limited thereto. Any modification or replacement that may be readily envisaged of by any persons skilled in the art within the technical scope disclosed in the embodiments of present application should fall into the scope claimed in the embodiments of the present application. Thus, the scope claimed in the embodiments of the present application should be subject to the claims.

The invention claimed is:

1. A service processing method, comprising:
obtaining, by a first base station, first indication information from a network side; wherein the first indication information comprises at least one of the following: service support indication information, indication information of an effective area, indication information of a first behavior, status indication information of a terminal device, indication information of first behavior execution time, or first behavior retry time;
transmitting, by the first base station, the first indication information to the terminal device, wherein the first indication information comprises the indication information of the first behavior;
transmitting, by the first base station, a first behavior execution command to the terminal device for the first behavior, the indication information of the first behavior is used by the terminal device to determine whether to refuse to execute the first behavior;
wherein the indication information of the first behavior comprises whether an execution of the first behavior is allowed;
wherein the indication information of the first behavior execution time comprises time from the terminal device receiving the first behavior execution command transmitted by the first base station to initiating execution of the first behavior;
wherein the first behavior comprises a handover;
the first behavior execution command comprises: a handover command; and
the execution of the first behavior comprises the terminal device initiates random access to a second base station cell, obtains cell synchronization, and transmits a handover complete message.

2. The method according to claim 1, wherein the service support indication information comprises whether a first service is supported;
the method further comprises: determining, by the first base station, according to the service support indication information, whether to execute establishment or modification of a quality of service flow corresponding to the first service.

3. The method according to claim 1, wherein
the method further comprises: determining, by the first base station, according to the indication information of the first behavior, whether the first behavior is executable.

4. The method according to claim 3, wherein an indication granularity of the indication information of the first behavior comprises at least one of the following: a terminal device, a session, a data flow.

5. A service processing method, comprising:
obtaining, by a terminal device, first indication information from a network side; wherein the first indication information comprises at least one of the following: service support indication information, indication information of an effective area, indication information of a first behavior, status indication information of the terminal device, indication information of first behavior execution time, or first behavior retry time;
obtaining, by the terminal device, a first behavior execution command for the first behavior from a first base station, and determining, according to the indication information of the first behavior, whether to refuse to execute the first behavior;
wherein the indication information of the first behavior comprises whether an execution of the first behavior is allowed;
wherein the indication information of the first behavior execution time comprises time from the terminal device receiving the first behavior execution command transmitted by the first base station to initiating execution of the first behavior;
wherein the first behavior comprises a handover;
the first behavior execution command comprises: a handover command; and
the execution of the first behavior comprises the terminal device initiates random access to a second base station cell, obtains cell synchronization, and transmits a handover complete message.

6. The method according to claim 5, wherein the service support indication information comprises whether a first service is supported;
the method further comprises: determining, by the terminal device, according to the service support indication information, whether the first service is executable.

7. The method according to claim 5, wherein
the method further comprises: determining, by the terminal device, according to the indication information of the first behavior, whether the first behavior is executable.

8. The method according to claim 7, wherein an indication granularity of the indication information of the first behavior comprises at least one of the following: a terminal device, a session, a data flow.

9. A service processing apparatus applied in a base station, comprising:
a processor and a memory, wherein the memory is configured to store a computer program, and the processor is configured to call and run the computer program stored in the memory to:
obtain first indication information from a network side; wherein the first indication information comprises at least one of the following: service support indication information, indication information of an effective area, indication information of a first behavior, status indication information of a terminal device, indication information of first behavior execution time, or first behavior retry time;
transmit the first indication information to the terminal device, wherein the first indication information comprises the indication information of the first behavior;
transmit a first behavior execution command to the terminal device for the first behavior, the indication information of the first behavior is used by the terminal device to determine whether to refuse to execute the first behavior;
wherein the indication information of the first behavior comprises whether an execution of the first behavior is allowed;
wherein the indication information of the first behavior execution time comprises time from the terminal device receiving the first behavior execution command transmitted by a first base station to initiating execution of the first behavior;
wherein the first behavior comprises a handover;
the first behavior execution command comprises: a handover command; and
the execution of the first behavior comprises the terminal device initiates random access to a second base station cell, obtains cell synchronization, and transmits a handover complete message.

10. The service processing apparatus according to claim 9, wherein the service support indication information comprises whether a first service is supported;
the processor is further configured to determine, according to the service support indication information, whether to execute establishment or modification of a quality of service flow corresponding to the first service.

11. The service processing apparatus according to claim 9, wherein
the processor is further configured to determine, according to the indication information of the first behavior, whether the first behavior is executable.

12. The service processing apparatus according to claim 11, wherein an indication granularity of the indication information of the first behavior comprises at least one of the following: a terminal device, a session, a data flow.

13. A non-transitory computer readable storage medium, configured to store a computer program, the computer program enables a computer to execute the method according to claim 1.

* * * * *